(12) United States Patent
Auernhammer et al.

(10) Patent No.: US 11,345,231 B2
(45) Date of Patent: May 31, 2022

(54) VALVE SYSTEM FOR A FUEL TANK

(71) Applicant: Alfmeier Präzision SE, Treuchtlingen (DE)

(72) Inventors: Helmut Auernhammer, Höttingen (DE); Ronny Gehlmann, Allersberg (DE); Erich Dörfler, Landsberg (DE); Lawrence Mukaronda, Nuremberg (DE)

(73) Assignee: Alfmeier Präzision SE, Treuchtlingen (DE)

(*) Notice: Subject to any disclaimer, the term of this patent is extended or adjusted under 35 U.S.C. 154(b) by 0 days.

(21) Appl. No.: 16/652,137

(22) PCT Filed: Oct. 26, 2018

(86) PCT No.: PCT/EP2018/079408
§ 371 (c)(1),
(2) Date: Mar. 30, 2020

(87) PCT Pub. No.: WO2019/081709
PCT Pub. Date: May 2, 2019

(65) Prior Publication Data
US 2020/0247233 A1    Aug. 6, 2020

(30) Foreign Application Priority Data

Oct. 27, 2017    (DE) ................. 10 2017 125 283.5

(51) Int. Cl.
*B60K 15/03*    (2006.01)
*B60K 15/035*    (2006.01)
(Continued)

(52) U.S. Cl.
CPC .. *B60K 15/03519* (2013.01); *B60K 15/03504* (2013.01); *B60K 15/04* (2013.01);
(Continued)

(58) Field of Classification Search
CPC ........ B60K 15/03519; B60K 15/03504; B60K 15/04; B60K 2015/03296;
(Continued)

(56) References Cited

U.S. PATENT DOCUMENTS 5,211,151 A    5/1993    Nakajima et al.
5,327,934 A    7/1994    Thompson
(Continued)

FOREIGN PATENT DOCUMENTS

| DE | 10 2005 060 217 A1 | 7/2006 |
|---|---|---|
| DE | 10 2008 062 243 A1 | 6/2010 |
| EP | 2468555 A2 | 6/2012 |
| WO | 2017/090029 A1 | 6/2017 |

OTHER PUBLICATIONS

German Office Action for Application No. 10 2017 125 283.5, dated Jun. 25, 2018, with English Translation.
International Search Report for Application No. PCT/EP2018/079408, dated Mar. 8, 2019.

*Primary Examiner* — Joseph J Dallo
(74) *Attorney, Agent, or Firm* — JK Intellectual Property Law, PA

(57) ABSTRACT

A valve system includes a housing with a tank connection for connecting to a fuel tank, a filter connection for connecting to an activated carbon filter, and a filling tube connection for connecting to a filling tube of the fuel tank. Both the tank connection and the filter connection and/or the filling tube connection can be in form of a connecting piece, connected directly or indirectly to the fuel tank through a connecting line leading to the fuel tank, the activated carbon filter or the filling tube. The tank connection/filter connection or the tank connection/filling tube connection can be fluidically connected to one another through a main vent duct. The tank connection or a tank-side main vent duct, and the filter connection or a filter-side main vent duct, can be fluidically connected by means of a secondary vent duct.

20 Claims, 14 Drawing Sheets

(51) Int. Cl.
*B60K 15/04* (2006.01)
*F02M 25/08* (2006.01)

(52) U.S. Cl.
CPC ............. *B60K 2015/03296* (2013.01); *B60K 2015/03509* (2013.01); *B60K 2015/03514* (2013.01); *B60K 2015/03576* (2013.01); *F02M 25/089* (2013.01); *F02M 25/0836* (2013.01)

(58) Field of Classification Search
CPC ........... B60K 2015/03509; B60K 2015/03514; B60K 2015/03576; B60K 15/035; B60K 2015/03523; F02M 25/0836; F02M 25/089
See application file for complete search history.

(56) References Cited

U.S. PATENT DOCUMENTS

| | | |
|---|---|---|
| 2010/0051116 A1 | 3/2010 | Martin et al. |
| 2012/0160219 A1* | 6/2012 | Hagen .............. B60K 15/03519 123/519 |
| 2012/0179354 A1* | 7/2012 | Hagen .............. B60K 15/03519 701/102 |
| 2012/0186670 A1* | 7/2012 | Hagen .............. B60K 15/03519 137/512 |
| 2014/0103232 A1 | 4/2014 | Deperraz |
| 2016/0177884 A1 | 6/2016 | Shimokawa |
| 2017/0030302 A1* | 2/2017 | Takezawa ........ B60K 15/03519 |
| 2018/0370351 A1* | 12/2018 | Vulkan .................... B60Q 9/00 |

* cited by examiner

A-A

B-B

C-C

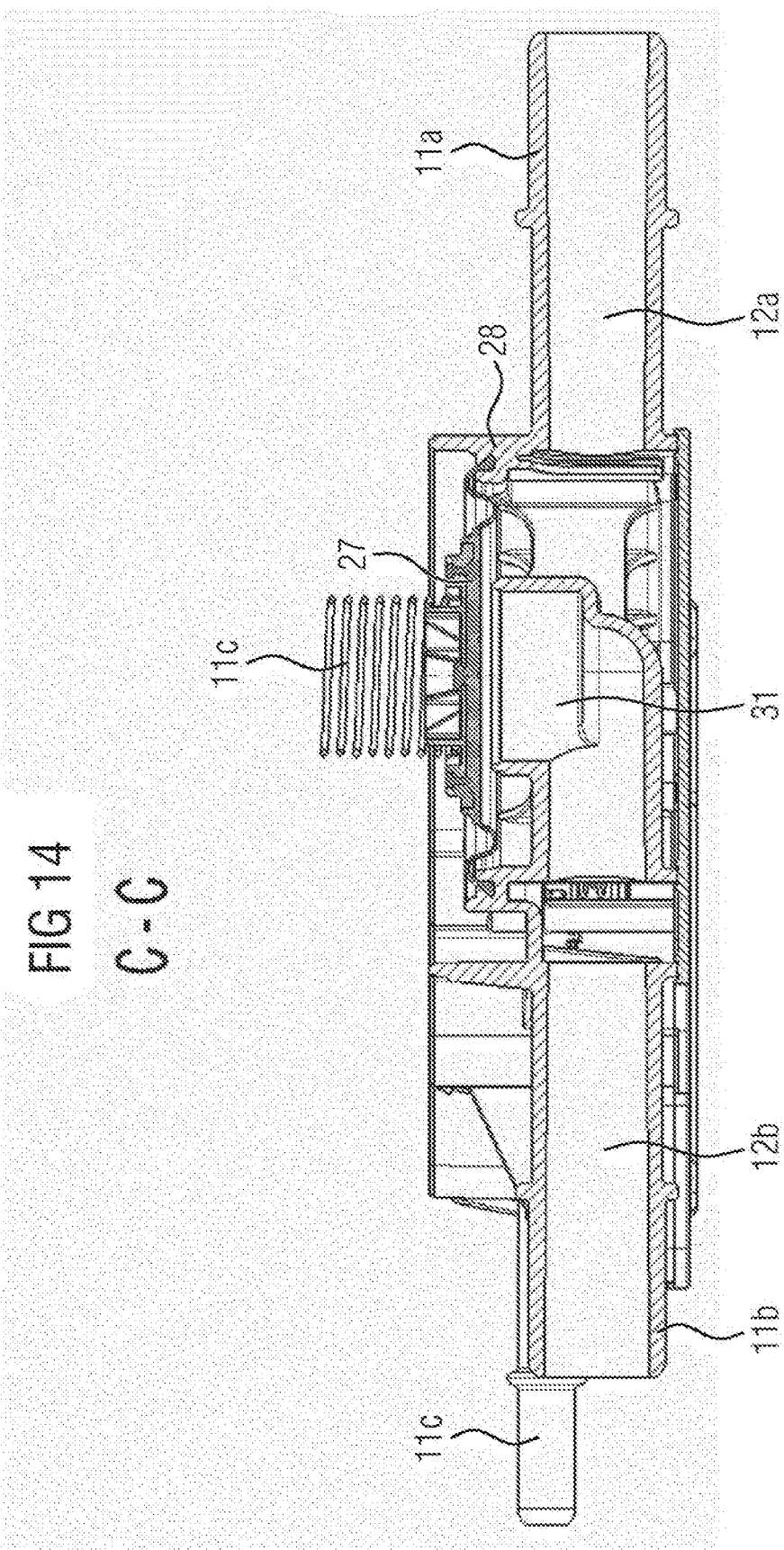

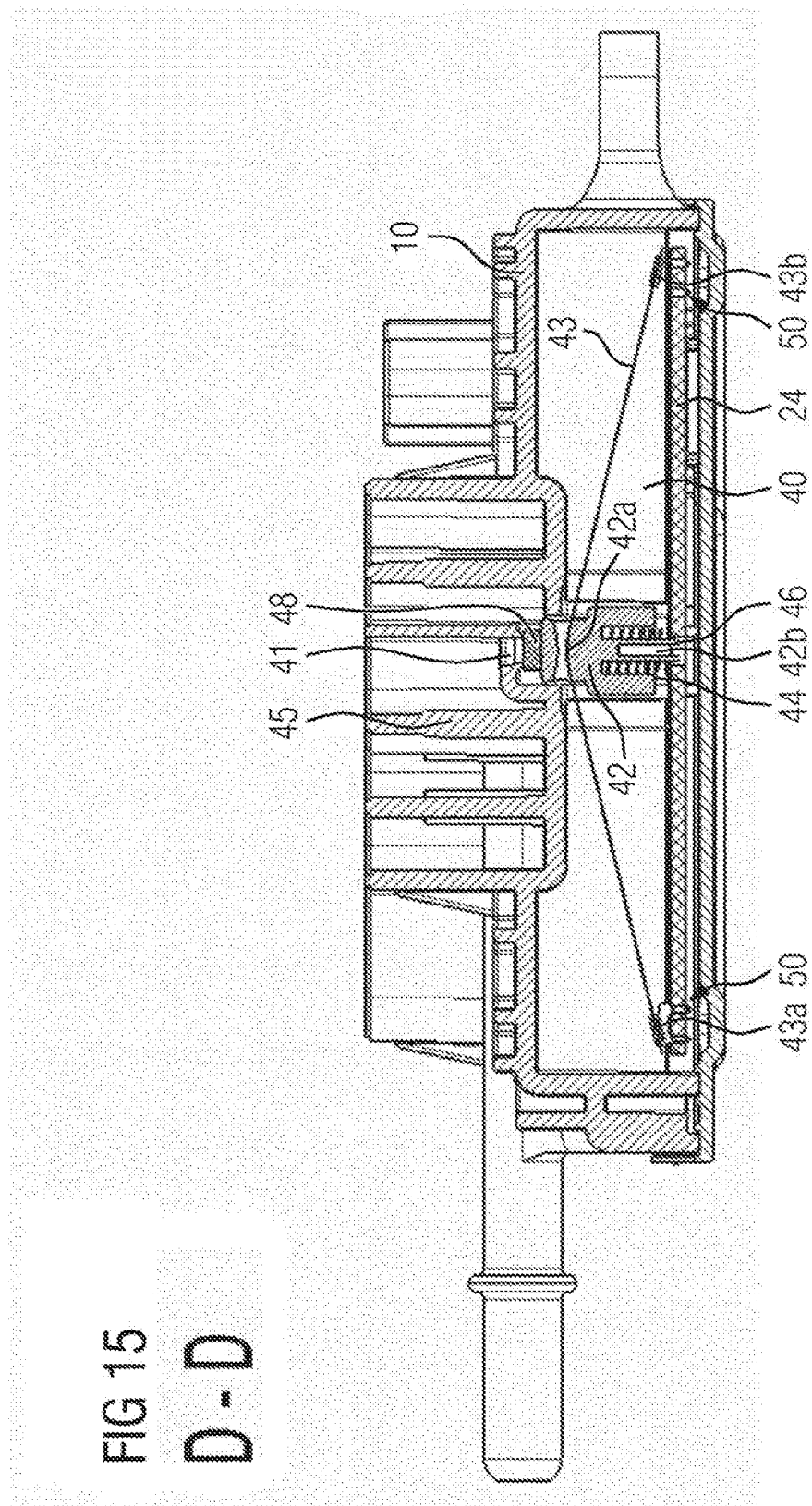

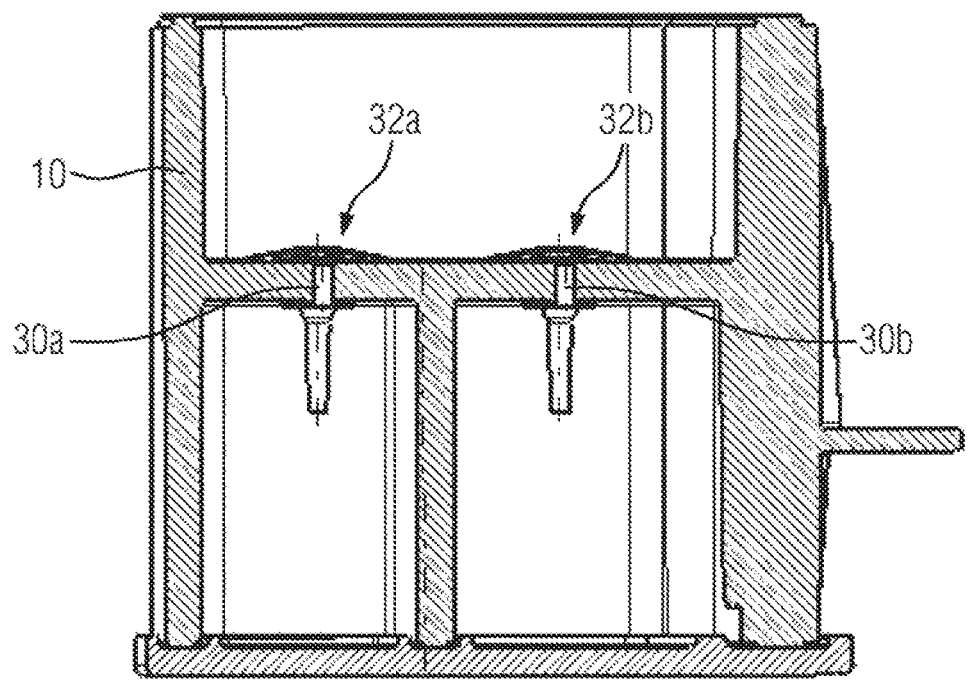

VALVE SYSTEM FOR A FUEL TANK

CROSS-REFERENCE TO RELATED APPLICATIONS

This application is a national stage of International Application No. PCT/EP2018/079408, filed Oct. 26, 2018, and claims benefit to German Application No. 10 2017 125 283.5, filed Oct. 27, 2017 both of which are incorporated by reference herein.

TECHNICAL FIELD

The disclosure relates to a valve system for a fuel tank of a vehicle. In particular, the disclosure relates to a valve system for the controlled and/or regulated and/or guided output or input of a fluid, preferably gasoline or air, or with fuel vapors containing hydrocarbons or air enriched or saturated with hydrocarbons, from a fuel tank or in one. In other words, the valve system can be used in connection with the aeration or deaeration of the fuel tank. The subsequent use of the term venting should in each case also include the possibility of ventilation, i.e. a vent duct can also be used as ventilation duct or a vent valve can also be used as ventilation valve.

BACKGROUND

Current vehicle tank systems comprise many individual valves, which serve different purposes in each case. An important purpose consists in preventing the emission of fuel vapors to the environment. Commercial gasoline has the property to emit gases containing volatile components, specifically hydrocarbons. However, these hydrocarbon emissions are not allowed to reach the atmosphere and are therefore guided by an activated carbon container or activated carbon filter (hereinafter also "ACF") to retain or adsorb the hydrocarbons. So the ACF can be cleaned again, fresh surrounding air is sucked by the ACF ("regeneration"). The hydrocarbons stored in the ACF are emitted to the passing air, fed to the engine and burned there while the vehicle is being operated. Here, the storage capacity of the ACF is chosen in such a way that the quantity of hydrocarbons that accumulate between two regeneration cycles can be absorbed.

When the tank is being refueled, the air enriched with hydrocarbons must be displaced from the tank without directly reaching the atmosphere. In conventional tank systems in Europe, hydrocarbon emissions are exclusively returned through a pipe connecting the tank with the filler neck during the refueling process and aspirated by the fuel nozzle. When the vehicle is being refueled, the ACF is therefore not enriched with hydrocarbons—or at least not significantly.

In conventional tank systems in the U.S., on the other hand, the vehicle must be capable of storing the hydrocarbon emissions removed from the tank during refueling, a process known as ORVR (Onboard Refueling Vapor Recovery). The systems installed therein must ensure that no hydrocarbons escape into the atmosphere through the filler neck during refueling. Therefore, the gasoline quantity fully enriched with hydrocarbons must be guided by the ACF during the refueling as well. Since the fresh surrounding air is also being sucked into the tank through the filler neck, it can also become enriched with hydrocarbons and enrich the ACF even more. Therefore, in the U.S., a small part of the gases is also returned through a pipe connecting the tank with the filler neck ("recirculation").

In hybrid vehicles, which in addition to an internal combustion engine and its associated fuel system also have an electric drive and are capable of traveling certain distances purely electrically, the resulting problem is that the internal combustion engine cannot be used for regenerating the ACF while the vehicle is being electrically driven. Therefore, to limit the enrichment of the ACF with hydrocarbons, the tank venting to the ACF in the tank systems of hybrid vehicles is closed with a valve, the fuel tank isolation valve or FTIV. As a result of this, the degassing of the fuel leads to a pressure increase in the fuel tank so no more degassing can take place starting at a certain pressure and temperature and an equilibrium is achieved.

Another important purpose of the valves in a tank system consists in limiting the quantity of fuel in the fuel tank. Refueling at the fuel pump ends when the fuel rises in the filling tube, thereby turning off the pump nozzle. In order to allow the fuel to rise in the filling tube, the venting pipe in the tank is closed by a float-controlled valve known as fill limit vent valve or FLVV. Subsequently, pressure increases in the tank, as a result of which no more fuel is allowed into the tank.

Even in case of an accident involving a rollover, it must be ensured that no fuel can escape from the vehicle's fuel tank ("rollover protection"). To accomplish this, another valve known as rollover valve or ROV is provided to prevent fuel from spilling into the ACF in a vehicle rollover and thus escape into the environment through the fresh air opening.

Nowadays, all the above-mentioned functions need separate components that must be positioned around the fuel tank or are in the fuel tank and must be connected to each other. The numerous connections and individual components create high complexity and the space needed is accordingly large. Since there is no more space available in the vehicle, this is done at the expense of the tank volume. Furthermore, mechanical valves incapable of adapting to changed situations have been used to date.

It is therefore the purpose of the disclosure to suggest a system that guarantees the functions necessary for a fuel tank, but is improved with regard to the above-mentioned disadvantages.

The purpose is accomplished by a valve system for a fuel tank having the features of the disclosure. In particular, it is a valve system for the controlled and/or guided and/or regulated output or input of a fluid, preferably gasoline or air, or air containing fuel vapors with hydrocarbons or enriched or saturated with hydrocarbons from a fuel tank or in one.

The valve system according to the disclosure comprises a housing with a tank connection for connecting the valve system to a fuel tank. Additionally, the housing comprises a filter connection for connecting the valve system to an activated carbon filter and a filling tube connection for connecting the valve system to a filling tube of the fuel tank. Both the tank connection and the filter connection and/or the filling tube connection can in each case be designed here in form of a connecting piece, connected in each case directly or indirectly to the fuel tank through a connecting line leading to the fuel tank, the activated carbon filter or the filling tube.

Here, either the tank connection and the filter connection or the tank connection and the filling tube connection are or can be fluidically connected to one another through a main vent duct. In the main vent duct, at least one main vent valve with a valve element is arranged, which moves the main vent duct to a closing position so no fluid can flow from the tank connection through the main vent duct to the filter connection or the filling tube connection. In a release position, the valve element releases the main vent duct so a fluid can flow from the tank connection through the main vent duct to the filter connection or the filling tube connection, i.e. from the fuel tank to the activated carbon filter or to the filling tube.

Here, the fluid is especially a gasoline or air enriched or saturated with hydrocarbons that is displaced from the fuel tank during the refueling process, for example.

Furthermore, the tank connection or a tank-side main vent duct, on the one hand, and the filter connection or a filter-side main vent duct, on the other hand, are or can be fluidically connected by means of a secondary vent duct. Alternately or additionally, the tank connection or the tank-side main vent duct, on the one hand, and the filling tube connection or a filling tube-side main vent duct or a filling tube-side main connecting duct, on the other hand, are or can be fluidically connected to one another through a or the secondary vent duct. In this way, the secondary vent duct can create a fluidic bypass to the main vent valve. In the secondary vent duct, at least one valve group with at least one secondary vent valve has been arranged, which closes the secondary vent duct in a closing position so that no fluid can flow from the tank connection or the tank-side main vent duct through the secondary vent duct to the filter connection or the filter-side main vent duct and/or from the tank connection or the tank-side main vent duct through the secondary vent duct to the filling tube connection or the filling tube-side main vent duct. In a release position, the valve element of the secondary vent valve releases the secondary vent duct so that a fluid can flow from the tank connection or the tank-side main vent duct through the secondary vent duct to the filter connection or the filter-side main vent duct and/or from the tank connection or the tank-side main vent duct through the secondary vent duct to the filling tube connection or the filling tube-side main vent duct.

Here, the term "tank-side" main vent duct is understood to be the section of the main vent duct between the fuel tank or the tank connection and the main vent valve or its valve element. Accordingly, the "filter-side" main vent duct is understood to be here the section of the main vent duct between the main vent valve or its valve element and the filter connection or the activated carbon filter, a "filling tube-side" main vent duct is understood to be the section of the main vent duct between the main vent valve or its valve element and the filling tube connection or the filling tube.

Thus, the idea of the disclosure consists of integrating the valve or valves that are arranged between fuel tank and activated carbon filter, and/or the valve or valves that are arranged between fuel tank and filling tube into a centralized valve unit in order to reduce the individual components. Depending on what "venting path" is preferred, the main vent duct leads from the fuel tank to the activated carbon filter or the filling tube and the secondary vent duct from the fuel tank merely to the same or another component or both to the activated carbon filter and to the filling tube. If one of the components (activated carbon filter or filling tube) is arranged in the main vent duct and the secondary vent duct also leads to the other component, then a supplementary venting is also facilitated by the component not connected to the main vent duct.

The valve element of the main vent valve and the valve element of the secondary vent valve can be preferably activated independently from one another, so that the main vent duct and the secondary vent duct can be released or closed independently from one another; in particular, the venting to the activated carbon filter and the filling tube can therefore be controlled independently from one another.

The at least one secondary vent valve is, for example, a valve having a valve element that can be activated by an SMA element (SMA: shape memory alloy). The basic functioning of such valves is known. Essentially, current is applied to the SMA element, which is a wire or band formed by a shape memory alloy, transformed from a martensitic to an austenitic structure above a transformation temperature, so that it warms up and shortens. In this case, the SMA element makes contact with the valve element in such a way that when it is shortened, the SMA element exerts a force on the valve element, thereby activating it, as a result of which a valve opening is released or closed.

The secondary vent valve can also be a known magnetic valve, for example.

Furthermore, the secondary vent valve can also be a valve with a dielectric elastomer actuator (DEA). DEAs consist, for example, of several polyurethane layers between which graphite layers are arranged as electrodes. If electrical voltage is applied to the electrodes so that neighboring electrodes are differently poled, then the electrodes attract each other and, owing to the flexibility of the polyurethane layer (elastomer), move towards one another. This shortens the entire actuator and the valve opens.

The valve element arranged in the main vent duct is or comprises in a preferred design, a valve membrane with a pressure side and a flow side, wherein a pressure chamber of the main vent valve is provided on the pressure side of the valve membrane, and wherein when the valve element is in closed position, the flow side of the valve closes the main vent duct and when the valve element is in release position, the main vent duct is opened.

Preferably, a prestressed element is provided in the pressure chamber, on the pressure side of the valve membrane, from which a force originates on the pressure side of the valve membrane. In particular, because of this, the valve element—specifically, the valve membrane, is prestressed in its closing position; for moving it back to the release position, the force originating from the prestressed element must at least be overcome, for example by the corresponding pressure conditions on the pressure side and flow side of the valve membrane.

The prestressed element itself is guided, for example, by means of the guiding aids arranged on the valve membrane or housing.

The pressure chamber of the main vent duct is preferably fluidically connected with the tank connection by means of a first opening and/or by means of a second opening with the filter connection and/or the filling tube connection. A first check valve can be arranged in the first opening to allow the fluid to flow from the tank connection to the pressure chamber and prevent it from flowing in opposite direction. A second check valve can be arranged in the second opening to allow the fluid to flow from the filter connection and/or the filling tube connection to the pressure chamber and prevent it from flowing in opposite direction. If there is excess pressure in the fuel tank compared to the atmospheric pressure, this excess pressure therefore prevails in the pressure chamber of the main vent duct and thus likewise on the pressure side of the valve membrane. If, on the other hand, negative pressure prevails in the fuel tank compared to the atmospheric pressure, this negative pressure is not present in the pressure chamber of the main vent valve and therefore on the pressure side of the valve membrane, but the atmospheric pressure. As long as it is ensured that in the first case there is at most the above-mentioned excess pressure on the flow side and in the second case at most the atmospheric pressure, the valve membrane—and with it, the valve element, will in both cases be maintained in its closing position due to the pressure conditions and/or the prestress by the prestress element in its closed position, i.e. the main vent valve is closed. To move it to the release position—and thus to open the main vent valve—the pressure must be reduced in the pressure chamber.

In a preferred embodiment, the main vent valve comprises at least one first pilot valve, which is or can be connected to the pressure chamber of the main vent valve, on the one hand, and to the filter-side or filling tube-side secondary vent duct, on the other hand. If there is excess pressure in the fuel tank compared to the atmospheric pressure, the first pilot valve serves to reduce the resulting excess pressure in the pressure chamber of the main vent duct by opening the fluidic connection to the filter-side or filling tube-side main or secondary vent duct and thus to the atmospheric pressure to the extent that the valve membrane and thus the valve element of the main vent valve is moved to its release position, thereby opening the main vent valve so the fluid can flow from the tank-side main vent duct to the filter-side or filling tube-side main vent duct.

Preferably, the maximum flow diameter of the first opening is smaller than the maximum flow diameter of the first pilot valve. This ensures that when the first pilot valve is opened, more fluid flows out of the pressure chamber through the first pilot valve than fluid flowing into the pressure chamber through the first opening, so that the pressure is reduced in the pressure chamber.

Above and in the following, maximum flow diameter is understood to be the maximum cross section available for fluid to flow, i.e. the cross section possibly available in the corresponding opening of the valves provided for the fluid to flow in case of maximum opening. A smaller flow diameter means that under the same pressure conditions per time unit, less fluid will be able to flow through this opening than through the opening having the comparably larger flow diameter.

In a preferred embodiment, the main vent duct comprises at least a second pilot valve that is or can be fluidically connected, on the one hand, to the pressure chamber of the main vent valve and, on the other hand, to the tank-side main vent duct and/or to a tank-side secondary vent duct. If there is negative pressure in the fuel tank compared to the atmospheric pressure, the second pilot valve serves to reduce the atmospheric pressure prevailing in the pressure chamber of the main vent duct by opening the fluidic connection to the tank-side main or secondary vent duct to the extent that that the valve membrane—and thus the valve element of the main vent valve—is moved to its release position, thereby opening the main vent valve so fluid, here especially air, can flow from the filter-side or filling tube-side main vent duct to the tank-side main vent duct.

Preferably, the maximum flow diameter of the second opening is smaller than the maximum flow diameter of the second pilot valve. As a result of this, it is ensured that when the second pilot valve is opened, more fluid can flow out of the pressure chamber through the second pilot valve than enter the pressure chamber through the second opening, so that the pressure is reduced in the pressure chamber.

In a preferred embodiment, the valve system comprises the first pilot valve and the second pilot valve. These two pilot valves allow an extensive control of the main vent valve, both under excess pressure and under negative pressure in the fuel tank, especially in connection with the above-mentioned openings in the pressure chamber and with the check valves arranged therein.

Here, the wording "tank-side" secondary vent duct refers here to the section of the secondary vent duct between the fuel tank or the tank connection and the secondary vent valve or its valve element. Accordingly, the "filter-side" secondary vent duct refers here to the section of the secondary vent duct between the secondary vent valve or its valve element and the filter connection or the activated carbon filter, the "filling tube-side" secondary vent duct refers to the section of the secondary vent duct between the secondary vent valve or its valve element and the filling tube connection or the filling tube.

Above and in the following, with regard to the valves, the phrases "on the one hand" and "on the other hand" are understood to be two opposite sides of a valve element of the respective valve that are fluidically opposite one another. Therefore, when the valve is open and the corresponding pressure conditions are present, fluid flows through the valve, from one side to the other. When the valve is closed, no such fluid flow occurs.

The first pilot valve and/or the second pilot valve include, in turn, for example, a valve element that can be activated by an SMA element to which electric current has been applied so it can selectively control the first or second pilot valve. However, in the case of the first and/or second pilot valve, it can also be, for example, a solenoid valve or also a valve with a dielectric elastomer actuator (DEA).

A further development of the disclosure foresees the tank connection or tank-side main vent duct and the filter connection or the filter-side main vent duct and the filling tube connection or the filling tube-side main connecting duct to be fluidically connected or connectable to one another by means of the secondary vent duct, wherein in the secondary vent duct at least two valve groups are arranged, namely at least one filter valve group with at least one filter secondary vent valve and at least one filling tube valve group with at least one filling tube secondary vent valve. The filter secondary vent valve or valves of the filter valve group are or can be fluidically connected, on the one hand, to one or the tank-side secondary vent duct and, on the other hand, to one or the filter-side secondary vent duct. The filling tube secondary vent valve or valves of the filling tube valve group are or can be fluidically connected, on the one hand, to the tank-side secondary vent duct and, on the other hand, to one or the filling tube-side secondary vent duct.

In this case, a venting of the fuel tank can take place both through the secondary vent duct because the fluid can escape through the activated carbon filter as well as through the filling tube without having to open the main vent valve, for example, by opening or closing the at least one filter secondary vent valve of the filter valve group and/or the at least one filling tube secondary vent valve of the filling tube valve group independently from one another. Also, the combination of venting through the main vent duct with one or both venting paths of the secondary vent duct is possible. In this way, the force or speed of the fluid can also be varied during venting.

Preferably, the filter valve group has two or three or four or several filter secondary vent valves and/or the filling tube valve group has two or three or four or several filling tube secondary vent valves. In particular, the filter secondary vent valves and/or the filling tube secondary vent valves are valves having one valve element that can be activated by an SMA element or are solenoid valves or also valves with a dielectric elastomer actuator (DEA). This opens up diverse combination possibilities of the various venting paths and a multi-step adjustment possibility with regards to the force or speed of the fluid during venting. With the main vent valve, which especially allows a relatively large flow diameter owing to the valve membrane, and the several secondary vent valves with the relatively small flow cross section of the filter valve group and the filling tube valve group, it is possible to regulate the fluid's volumetric flow. Depending on the number of secondary vent valves, this allows an adjustment or stepwise control for the venting force through the activated carbon filter and/or through the filling tube.

In a constructively advantageous embodiment, the tank-side secondary vent duct forms a common first valve chamber both for all filter secondary vent valves and for all filling tube secondary vent valves, preferably also for the second pilot valve as well. It can further be provided for the filter-side secondary vent duct to form a common second valve chamber for all filter secondary vent valves. It can also be provided for the filling tube-side secondary vent duct to form a common third valve chamber for all filling tube secondary vent valves, wherein the second and third valve chamber are fluidically separated by a separating wall.

A further development of the disclosure provides a safety valve for the system, especially for excessive pressure and/or negative pressure, fluidically connected to the tank-side main and/or secondary vent duct. In addition, the safety valve can be fluidically connected with the filter-side main and/or secondary vent duct. Such a fluidic connection can in each case take place directly or indirectly, i.e. by means of an intermediate duct or intermediate chamber, for example. Preferably, the housing of the safety valve is executed as one single piece with the valve system housing, thereby preventing the pressure in the fuel tank to exceed certain limits, both with regard to excess pressure and negative pressure, especially when the valve system is not being operated.

The secondary vent valves and/or the pilot valves and/or all additional valves that have a valve element that can be activated by an SMA element or have a valve with a dielectric elastomer actuator (DEA) or are a solenoid valve, are preferably arranged on a common printed circuit board in order to reduce the number of needed components. So an electric current can be applied to the SMA elements, for example, in order for the valve to be opened, the SMA elements—specifically, their ends—are electrically connected to the printed circuit board. In particular, the printed circuit board is also connected to a control and evaluation unit of the vehicle, so that the valve system can be controlled to vent the fuel tank by means of the control and evaluation unit of the vehicle, wherein in an advantageous way, the measured values determined in other places of the vehicle are taken into account, e.g. an expected lateral acceleration in the tank or a response from the ACF regeneration management notifies whether a regeneration of the activated carbon filter with the internal combustion engine can take place at this moment. As a result of this, the valve system is an electronically-controlled valve system for the fuel tank of a vehicle.

An advantageous further development additionally provides the integration or arrangement of several sensors on the printed circuit board, especially pressure sensors and/or temperature sensors and/or position sensors and/or acceleration sensors and/or sensors to determine the gasoline composition and therefore the quality of the fuel or the printed circuit board carries the necessary electronic circuit to determine the pressure, the temperature, the position and/or the acceleration and/or the has composition. This allows conditions inside the fuel tank to be more precisely determined, allowing the switch-off level and/or an evaluation of the pressure in the fuel tank and/or filling tube to be controlled, for example. A connection of the printed circuit board with the control and evaluation unit of the vehicle allows the individual measured values to be forwarded to the control and evaluation unit and considered when the valve system is controlled by the control and evaluation unit to vent the fuel tank.

It is furthermore advantageous if the valve system comprises a fuel separator and/or a rollover valve, wherein the rollover valve is especially integrated into the fuel separator, and wherein the fuel separator and/or the rollover valve are preferably integrated between the tank connection and the fuel tank or into the tank-side main venting line. As a result of this, further functions necessary for a fuel tank are integrated into the valve system.

BRIEF DESCRIPTION OF THE DRAWINGS

The disclosure will be explained below, also with regard to additional features and advantages, by describing embodiments and making references to the enclosed drawings, which show in each case:

FIG. 14 is a sectional view of a main vent valve of the valve system according to the second embodiment along line C-C according to FIG. 9;

FIG. 15 is a sectional view of a valve of the valve system according to the second embodiment along line D-D according to FIG. 9;

FIG. 16 is a longitudinal section of the valve system according to the second embodiment along line E-E according to FIG. 9;

DETAILED DESCRIPTION

Figure 1:
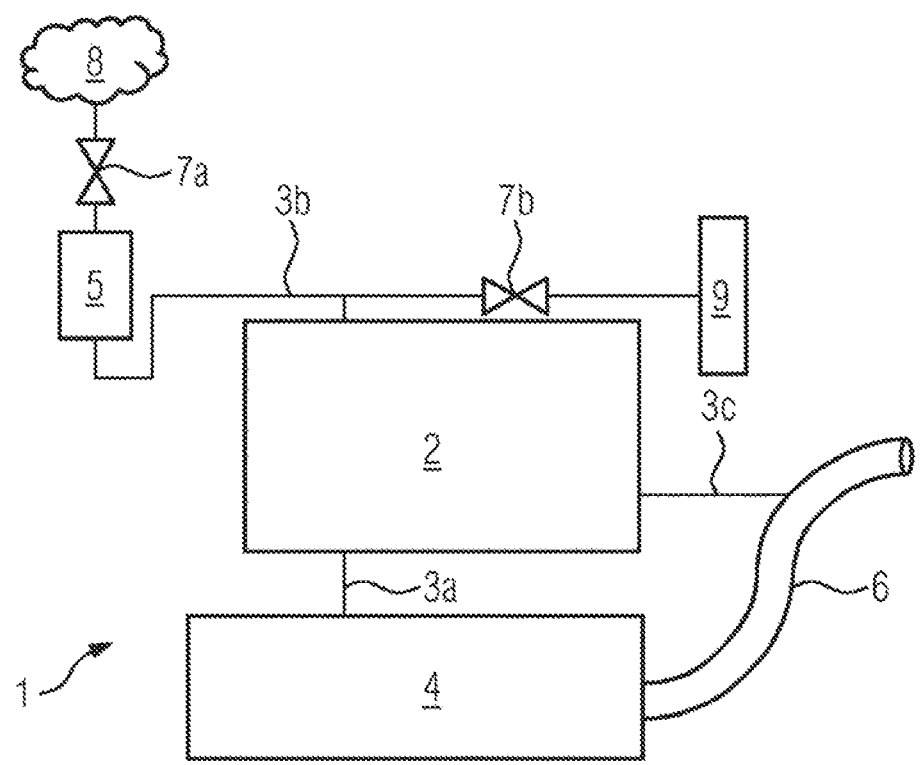
FIG. 1 is a simplified schematic sketch of a vehicle tank system with a valve system.

FIG. 1 shows a tank system 1 of a vehicle with a valve system 2. The valve system 2 is connected to a fuel tank 4 by means of a first vent line 3a or partially mounted therein, so that a fluid, in this case air containing hydrocarbons, can escape from the fuel tank 4 to the valve system 2. By means of a second vent line 3b, the valve system 2 is connected to an activated carbon filter 5, in which the hydrocarbons that are in the fluid being guided through are retained or adsorbed. Moreover, the fuel tank 4 comprises a filling tube 6, through which the fuel tank 4 can be refueled. A third vent line 3c leads from the valve system 2 to the filling tube 6, in order to return the fluid escaping from it back to the filling tube 6 when the fuel tank 4 is being vented. When the vehicle is operating, the activated carbon filter 5 is regenerated by opening a valve 7a, so that fresh air from the atmosphere 8 is drawn by the activated carbon filter and supplied to the internal combustion engine 9 of the vehicle together with the fluid by opening a valve 7b.

Figure 2:
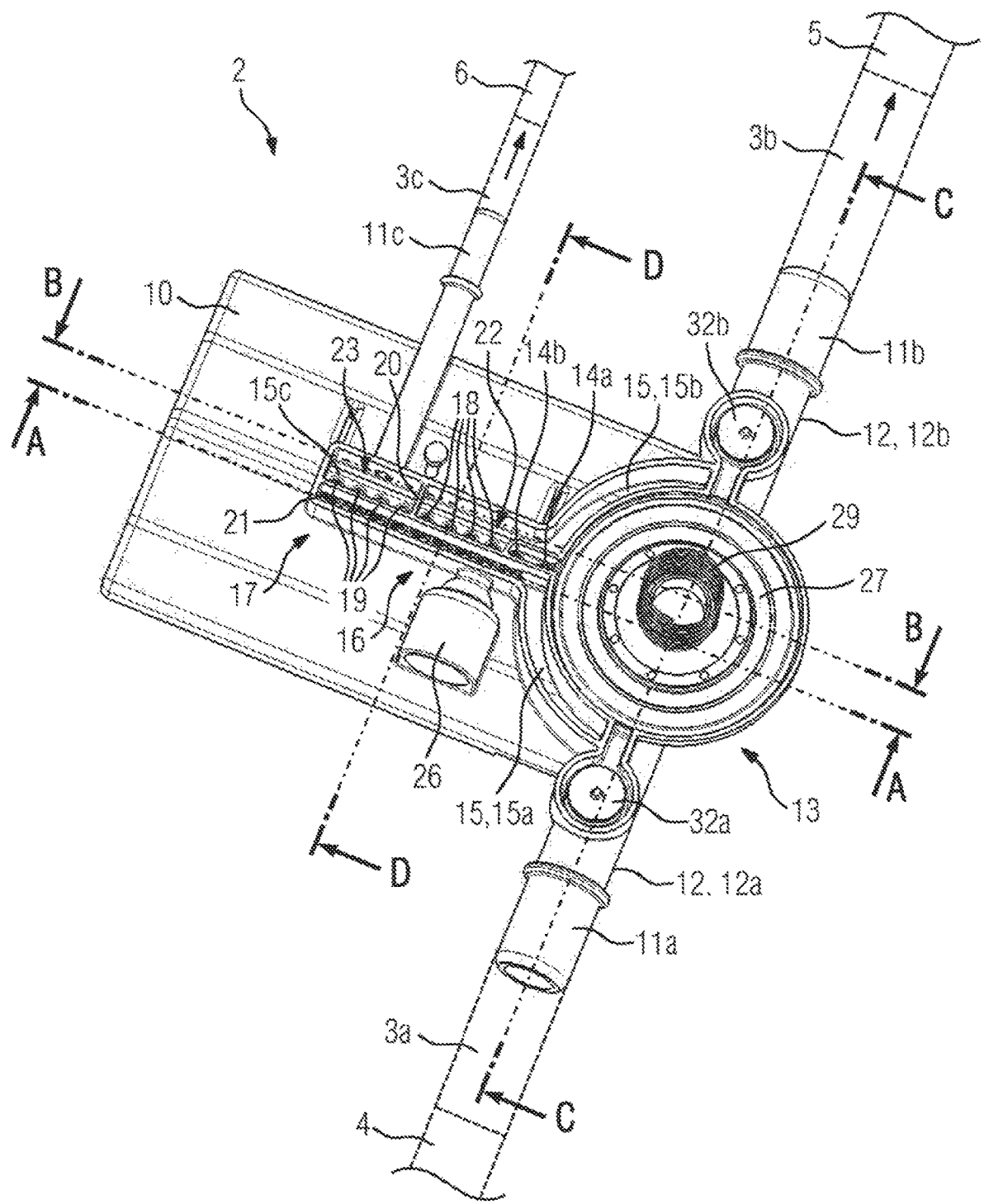
FIG. 2 is a perspective top view of a valve system according to a first embodiment.
Figure 3:
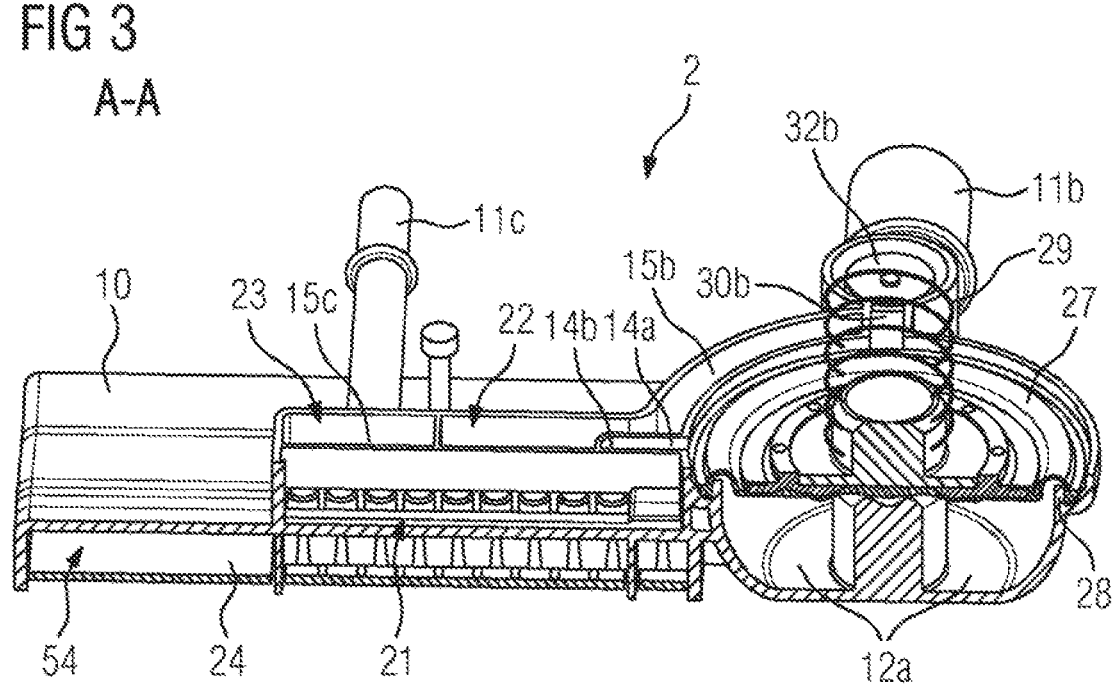
FIG. 3 is a longitudinal section of the valve system according to the first embodiment in a perspective view according to FIG. 2.
Figure 4:
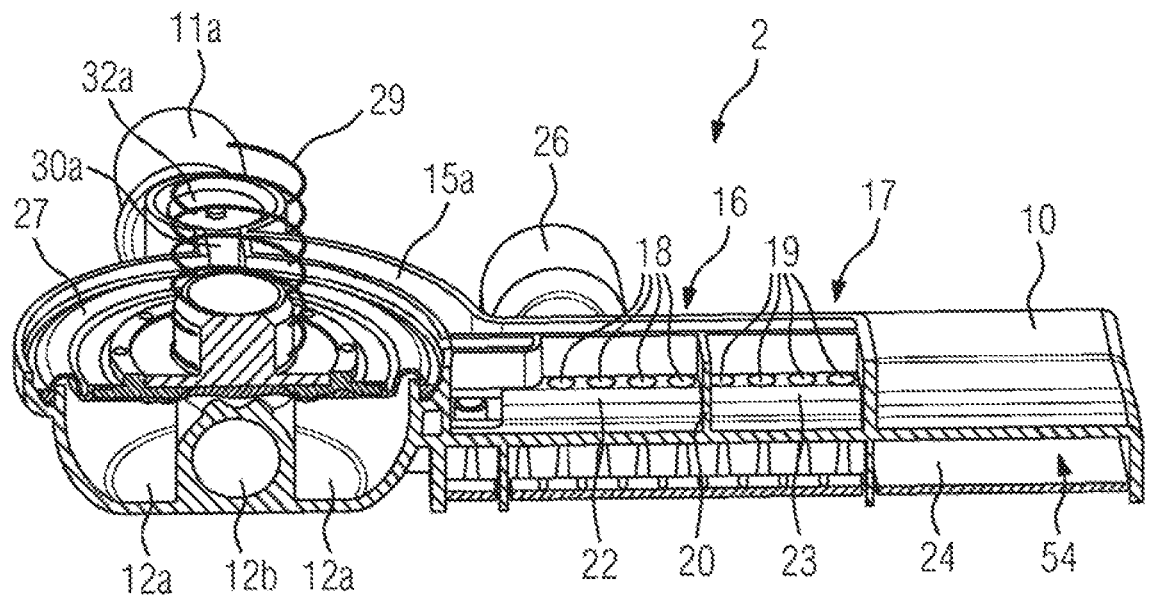
FIG. 4 is a perspective view of a longitudinal section of the valve system according to the first embodiment in along line B-B according to FIG. 2.
Figure 5:
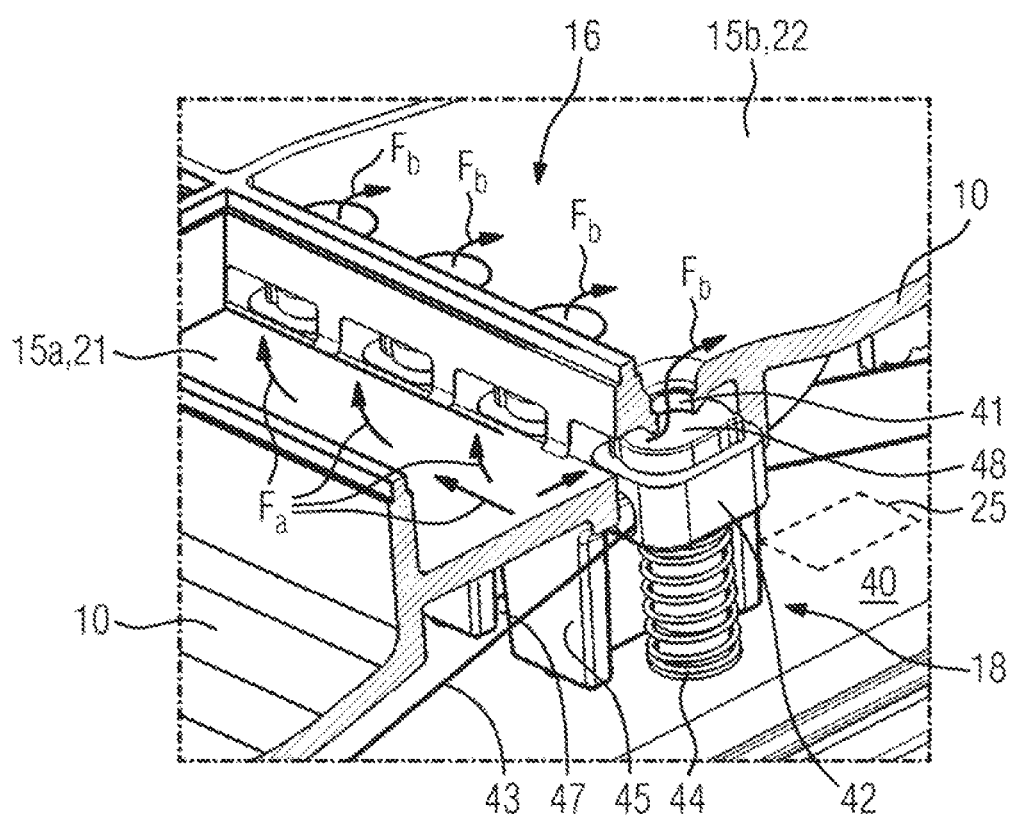
FIG. 5 is a valve group of the valve system according to the first embodiment.

FIG. 2 shows a perspective view of the valve system 2 according to a first embodiment for the fuel tank 4, FIG. 3 and FIG. 4 show in each case a longitudinal section through the valve system 2 according to FIG. 2, and FIG. 5 shows an enlarged detail of the valve system 2. Here, the fuel tank 4, the activated carbon filter 5 and the filling tube 6 as well as the vent lines 3a, 3b, 3c possibly connecting the valve system 2 are indicated with dashed lines. In principle, it could also be conceivable to connect the valve system 2, in each case without vent line, directly to the fuel tank 4, the activated carbon filter 5 or the filling tube 6 or to integrate the valve system 2 in each case therein.

The valve system 2 comprises a housing 10 with a tank connection 11a for connecting the valve system 2 to the fuel tank 4 or to the vent line 3a leading to the fuel tank 4. Furthermore, the housing 10 comprises a filter connection 11b for connecting the valve system 2 to the activated carbon filter 5 or to the vent line 3b leading to the activated carbon filter 5 as well as a filling tube connection 11c for connecting the valve system 2 to the filling tube 6 of the fuel tank 4 or the vent line 3c leading to the filling tube 6. On the top side, the assembled housing 10 can be closed by a housing lid (not shown), on the underside by a housing bottom (likewise not shown), so that it is pneumatically sealed towards the surroundings.

In the embodiment shown, the tank connection 11a and the filter connection 11b are or can be fluidically connected to one another through a main vent duct 12. It would also be possible for the main vent duct 12 to connect the tank connection 11a and the filling tube connection 11c, something that is not explicitly shown here. A main vent valve 13 that moves the main vent duct 12 to a closing position has been arranged in the main vent duct 12. The main vent valve 13 additionally comprises two pilot valves, a first pilot valve 14a and a second pilot valve 14b, which are also executed as valves with a valve element that can be activated by an SMA element (cf. FIG. 8).

In the embodiment shown, the tank connection 11a, more precisely a tank-side main vent duct 12a, is fluidically connected to the filter connection 11b, more precisely to a filter-side main vent duct 12b, and the tank connection 11a, more precisely the tank-side main vent duct 12a, to the filling tube connection 11c by means of a secondary vent duct 15. A filter valve group 16 and a filling tube valve group 17, which includes here in an exemplary way in each case four secondary vent valves, specifically four secondary vent valves 18 of the filter valve group 16 and four filling tube secondary vent valves 19 of the filter valve group 17, which in each case have one valve element that can be activated by an SMA element (cf. FIG. 8), which closes or releases the secondary vent duct 15 towards the activated carbon filter 5 or the filling tube 6, are arranged in a secondary vent duct 15. FIG. 5 shows a detail of the system 2, which comprises such a valve group, in this case the filter valve group 16 with the filter secondary vent valves 18.

The secondary vent duct 15 has various sections or branches. A tank-side secondary vent duct 15a leads from the tank connection 11a, more precisely the tank-side main vent duct 12a, to the secondary vent valves 18, 19 of the filter valve group 16 and the filling tube valve group 17, so that when the fuel tank 4 is being vented, fluid can initially flow to the opened secondary vent valves 18, 19 (FIG. 5 illustrates this with arrows Fa), then through these and finally from them—as shown by arrows Fb in FIG. 5—to the activated carbon filter 5 or also to the filling tube 6. In other words, the filter valve group 16 or its filter secondary vent valves 18 and the filling tube valve group 17 or its filling tube secondary vent valves 19 are, on the one hand, in each case connected to the tank-side secondary vent duct 15a. On the fluidically other side of the secondary vent valves 18, 19—that is, on a side of the secondary vent valves 18, 19 of the valve group 16, 17 fluidically facing the filter connection 11b or the filling tube connection 11c, the secondary vent duct 15 has two sections separated from one another by a separating wall 20, namely a filter-side secondary vent duct 15b and a filling tube-side secondary vent duct 15c. In other words, the filter valve group 16 is therefore connected on its other side to the filter-side secondary vent duct 15b; on its other side, the filling tube valve group 17 is thus connected to the filling tube-side secondary vent duct 15c.

In the area of the secondary vent valves 18, 19 or of the valve groups 16, 17, the tank-side secondary vent duct 15a forms a common first valve chamber 21, through which the fluid escaping from the fuel tank 4 can be supplied to each one of the secondary vent valves 18, 19. The filter-side secondary vent duct 15b forms a second valve chamber 22 and the filling tube-side secondary vent duct 15c forms a common third valve chamber 23. The second valve chamber and the third valve chamber are fluidically separated from one another by the separating wall 20.

All ducts 12, 12a, 12b, 15, 15a, 15b, 15c described above are executed as single pieces with the housing 10 of the valve system 2 and formed by the corresponding separating walls 10 executed on the housing, wherein the number of components of the valve system 2 can be clearly reduced. In addition, the valves (14a, 14b, 18, 19) having a valve element that can be activated by an SMA element are arranged on a common printed circuit board 24. Moreover, several sensors 25 such as pressure sensors and/or temperature sensors and/or position sensors and/or acceleration sensors and/or sensors to determine the gasoline composition and thus fuel quality, can be integrated into the printed circuit board 24 in order to record measured values inside the valve system 2 that can then be used, for example, to control the valve system 2 or individual valves. FIG. 5 exemplarily indicates such a sensor 25 with broken lines.

The valve system 2 furthermore comprises a safety valve 26, in this case a combined safety valve both for excess pressure and for negative pressure that can possibly be built inside the fuel tank 4, especially when the valve system 2 itself is not activated. To do this, the safety valve 26 is connected to the tank-side secondary vent duct 15a. The housing of the safety valve 26 is executed as one single piece with the housing 10 of the valve system 2 or as part of the housing 10 of the valve system 2.

Furthermore, the valve system 2 can have a fuel separator and a rollover valve that is integrated into the fuel separator, for example. As far as a fuel separator and/or a rollover valve are provided, they are integrated between the tank connection 11a and the fuel tank 4 or also in the tank-side main vent duct 12a. The structure and function of such fuel separators and/or rollover valves are known to the specialist from the state of the art, so that owing to reasons of clarity, a separate illustration has been dispensed with.

The main vent valve 13 comprises as valve element a valve membrane 27, which is circularly executed here. In an edge area, the valve membrane 27 has a circumferential U-shaped section that engages in a likewise circularly executed U-shaped sealing seat 28 executed from the housing 10 of the valve system 2. The valve membrane has a pressure side 27a and a flow side 27b, wherein a pressure chamber 33 of the main vent valve 13 is provided on the pressure side 27a. A ring-shaped outer partial area of the flow side 27b borders on the tank-side main vent line 12a, an inner partial area of the flow side 27b borders on the filter-side main vent duct 12b. The valve membrane 27 and with it, the valve element of the main vent valve 13, are movable between a closing position and a release position. In the closing position, the flow side 27b of the valve membrane 27 closes the main vent duct 12 by closely fitting the valve membrane 27 on an opening 31 of the filter-side main vent duct 12b and fluidically closing it. In the release position, the flow side 27b of the valve membrane 27 releases the main vent duct 12 by lifting the valve membrane 27 from the opening 31 of the filter-side main vent duct 12, thereby allowing fluid to flow into or out of the filter-side main vent duct 12b. In the pressure chamber 33, a prestress element 29, here a threaded compression spring from which force is exerted on the pressure side 27a of the valve membrane 27—provided it is not compensated by other forces—presses the flow side 27b of the valve membrane 27 against the opening 31 of the filter-side main vent duct 12b, thereby closing the main vent valve 13, has been provided on the pressure side 27a of the valve membrane 27.

The pressure chamber 33 is fluidically connected to the tank connection 11a by means of a first opening 34a and to the filter connection 11b by means of a second opening 34b. In the first opening 34a, a first rollover valve 32a that allows fluid to flow from the tank connection 11a to the pressure chamber 33 and prevents it from flowing in opposite direction is arranged. In the second opening, a second rollover valve 32b that allows fluid to flow from the tank connection 11b to the pressure chamber 33 and prevents it from flow in opposite direction is arranged. The first opening 34a is arranged on one end or edge of a first fluid duct 30a (see FIG. 6) or inside a first fluid duct 30a, so that the first fluid duct 30a extends on both sides of the first opening 34a (see FIG. 7). The second opening 34b is arranged on one end or edge of a second fluid duct 30b (see FIG. 6) or inside a second fluid duct 30b, so that the second fluid duct 30b extends on both sides of the second opening 34b (see FIG. 7).

Figure 8:
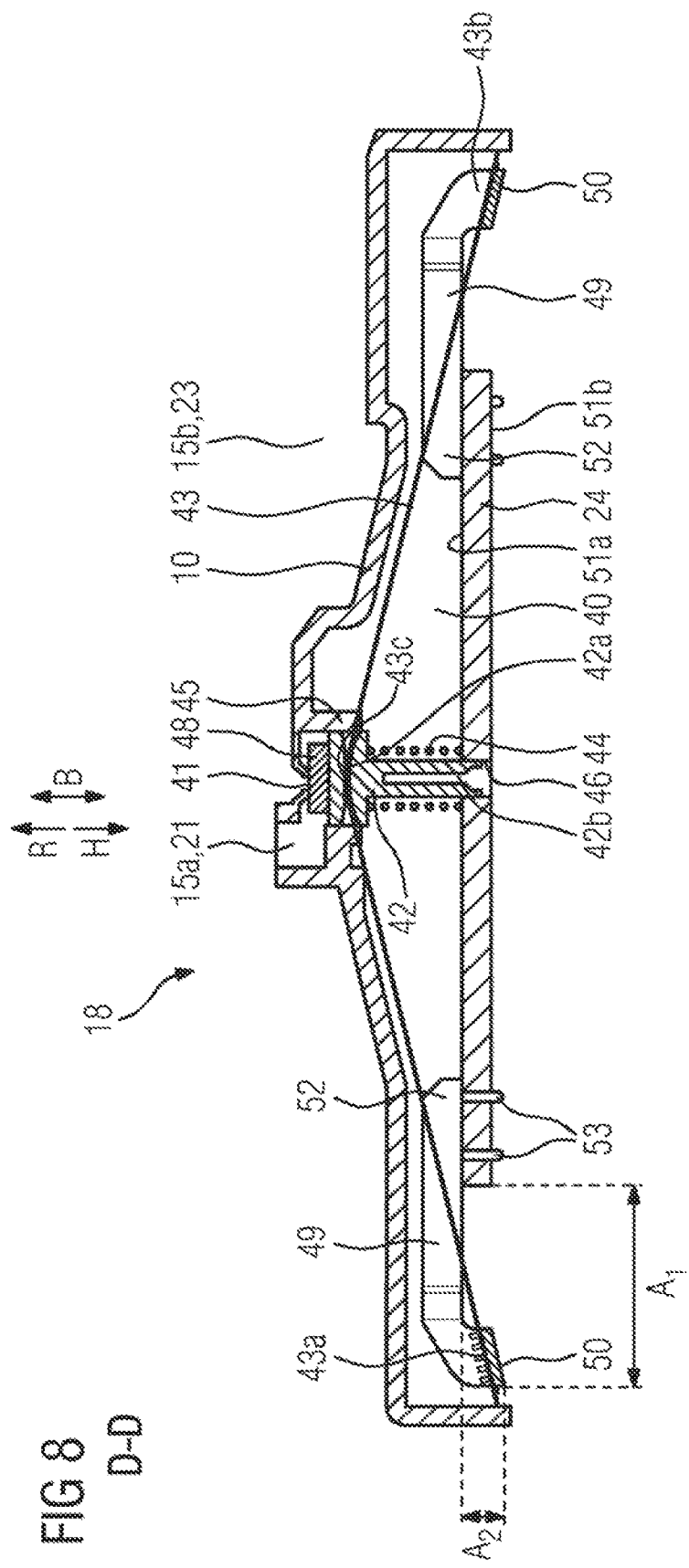
FIG. 8 is a sectional view of a valve of the valve system according to the first embodiment along line D-D according to FIG. 2.

The main vent valve 13 comprises a first pilot valve 14a and a second pilot valve 14b that have in each case a valve element that can be activated by an SMA element (cf. FIG. 8). The first pilot valve 14a is fluidically connected, on the one hand, to the pressure chamber 33 of the main vent valve 13 and, on the other hand, to the filter-side main vent duct 12b (see FIG. 6) or to the filter-side secondary vent duct 15b (see FIGS. 2, 3, 4). The second pilot valve 14b is, on the one hand, fluidically connected to the pressure chamber 33 of the main vent valve 13 and, on the other hand, to the tank-side main vent duct 12a or to a tank-side secondary vent duct 15a (see FIGS. 2, 3, 4).

Figure 6:
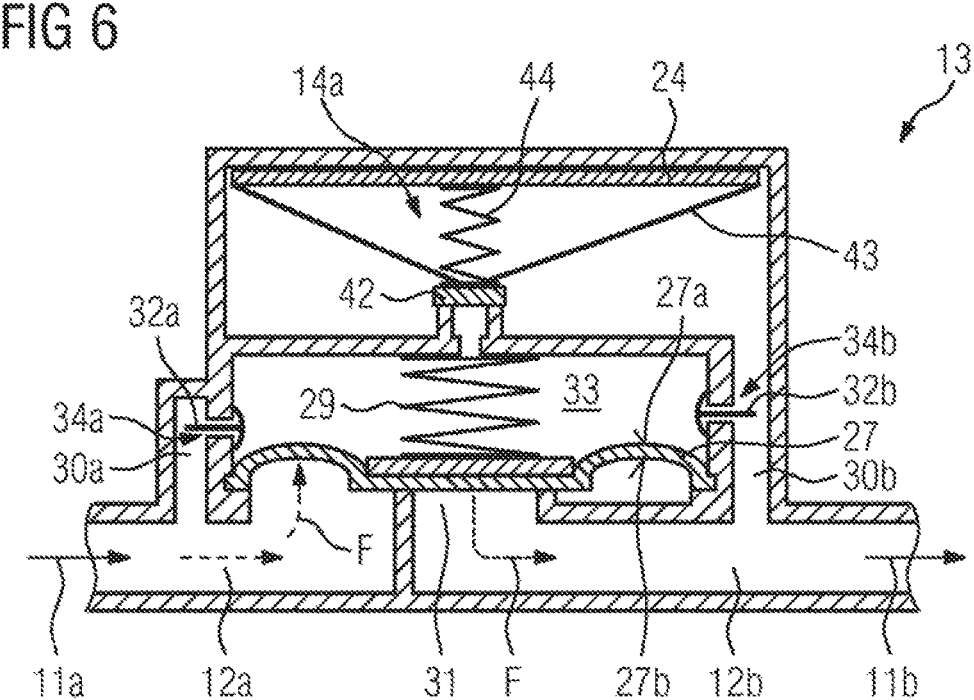
FIG. 6 is a schematic sketch of a main vent valve of the valve system according to the first embodiment.

FIG. 6 shows, in particular, that the two pilot valves 14a, 14b make it possible to have comprehensive control of the main vent valve 13 both when there is excess pressure and negative pressure in the fuel tank. When there is excess pressure in the fuel tank 4 (compared to the atmospheric pressure), excess pressure initially prevails in the pressure chamber 33 too and the main vent valve 13 is closed. Opening the first pilot valve 14a, opens a fluidic connection to the atmospheric pressure, as a result of which the excess pressure in the pressure chamber 33 is reduced and the main vent valve 13 finally opens. When there is negative pressure in the fuel tank 4 (compared to the atmospheric pressure), the pressure chamber 33 is at first fluidically connected to the atmospheric pressure and the main vent valve 33 is closed. Opening the second pilot valve 14b opens a fluidic connection to the negative pressure in the fuel tank 4, as a result of which the pressure in the pressure chamber 33 is reduced and the main vent valve 13 finally opens.

To ensure the pressure reduction in the pressure chamber necessary for opening the main vent valve 33 by the pilot valves 14a and 14b, it must be ensured that more fluid flows out of the pressure chamber 33 through the respective opened pilot valve 14a, 14b than through the first opening 34a or the second opening 34b than flows into it. To achieve this, it is provided that the maximum flow diameter of the first opening 34a with the first check valve 32a is smaller than the maximum flow diameter of the first pilot valve 14a and that the maximum flow diameter of the second opening 34b with the second check valve 32b is smaller than the flow diameter of the second pilot valve 14a.

Figure 7:
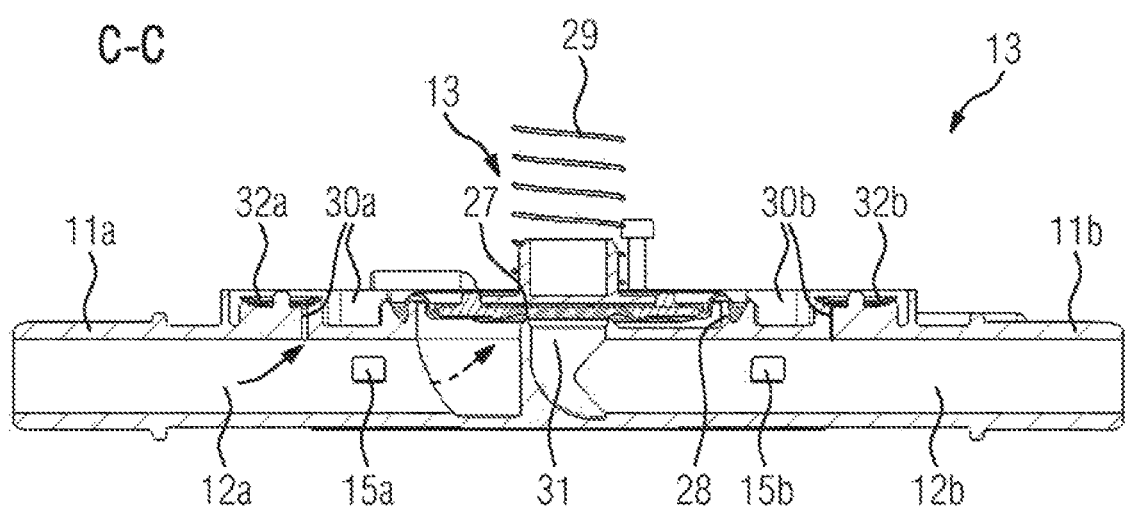
FIG. 7 is a sectional view of a main vent valve of the valve system according to the first embodiment along line C-C according to FIG. 2.

The basic functioning or structure of the main vent valve 13 will be shown and explained in greater detail by means of FIGS. 6 and 7. When the fuel tank 4 is being refueled, volumetric flows greater than 40 L/min are anticipated, although the pressure in the fuel tank 4 must be maintained at a low level so the fuel flowing through the filling tube 6 does not rise prematurely, leading to the switching off of the fuel nozzle. Here, this is achieved by the main vent valve 13 executed as pre-controlled membrane valve. If the pressure rises in the fuel tank 4, i.e. if such an excess pressure occurs there compared to the atmospheric pressure, then the fluid (gasoline) flows out of the fuel tank 4 through the vent line 3a, the tank connection 11a and into the main vent duct 12, more precisely the tank-side main vent duct 12a. The valve membrane 27 is closed, meaning that the fluid cannot keep flowing to the activated carbon filter 5. The fluid flows through the first fluid duct 30a, the first opening 34a and the open first check valve 32a into the pressure chamber 33 of the main valve 13. The second check valve 32b is closed, like the two pilot valves 14a, 14b. Therefore, excess pressure compared to the atmospheric pressure starts building up in the pressure chamber 33 too. The valve membrane 27 is thus pressed against the opening 31 of the filter-side main vent duct 12b, closing the valve element in its closing position and thus the main vent valve 13. No fluid can flow out of the fuel tank 4 through the main vent duct 12 and into the activated carbon filter 5.

Excess pressure can also occur in the closed fuel tank 4 due to warming up, for example.

So fluid can flow out of the fuel tank 4 through the main vent duct 12 into the activated carbon filter 5 and thus allow the excess pressure in the fuel tank 4 to be reduced, the main vent valve 13 must be opened. To do this, the pressure in the pressure chamber 33 and therefore on the pressure side 27a of the valve membrane 27 must be reduced to the extent that the valve membrane 27—owing to the fluid pressure acting on its flow side 27b in the area of the tank-side main vent duct 12a—lifts off from the opening 31 of the filter-side main vent duct 12b, thereby moving the valve element to its release position. As a result of this, the main vent valve 13 opens and releases the main vent duct 12. The pressure in the pressure chamber 33 is reduced by opening the first pilot valve 14a. As a result of that, fluid can flow out of the pressure chamber 33 and towards the activated carbon filter 5. Since the first check valve 32a remains open, fluid keeps flowing out of the fuel tank 4 into the pressure chamber 33, but this inflowing volumetric flow of the fluid is considerably smaller than the outflowing volumetric flow towards the activated carbon 5 because the flow diameter of the first opening 34a with the first check valve 32a is considerably smaller than the flow diameter of the opened first pilot valve 14a. Thus, the pressure in the pressure chamber 33 is reduced by the opening of the first pilot valve 14a, the main vent valve 13 opens and the main vent duct 12 is released for the fluid to flow from the fuel tank 4 to the activated carbon filter 5 and thus for reducing pressure in the fuel tank 4. The fluid can thus flow from the tank-side main vent 12a duct through the main vent valve 13 into the filter-side main vent duct 12b, which is indicated in FIG. 6 by dashed arrows F.

If there is negative pressure in the fuel tank 4 (which can be caused, for example, by cooling), the pressure compensation can likewise be controlled by the main vent valve 13. If the pressure falls in the fuel tank 4, meaning that a negative pressure occurs there compared to the atmospheric pressure, fluid (gasoline or air) flows over the activated carbon filter 5 through the vent line 3b, the filter connection 11b into the main vent duct 12, more precisely the filter-side main vent duct 12b. The valve membrane 27 is closed, which means that the fluid cannot keep flowing towards the fuel tank 4. The fluid flows through the second fluid duct 30b, the second opening 34b and the open second check valve 32b into the pressure chamber 33 of the main vent valve 13. Since the first check valve 32a is closed, as are the two pilot valves 14a, 14b, atmospheric pressure essentially prevails in the pressure chamber 33 and thus the pressure is higher than in the tank-side main vent duct 12a and thus in the area of the flow side 27b of the valve membrane 27 that borders on the tank-side main vent duct 12a. The valve membrane 27 is therefore pressed against the opening 31 of the filter-side main vent duct 12b, the valve element is consequently in its closing position and thus the main vent valve 13 is closed. No fluid can flow from the activated carbon filter 5 through the main vent duct 12 into the fuel tank 4.

So fluid can flow from the activated carbon filter 5 through the main vent duct 12 to the fuel tank 4 and the negative pressure in the fuel tank 4 can thus be relieved, the main vent valve 13 must be opened. So this can be done, the pressure in the pressure chamber 33 and thus on the pressure side 27a of the valve membrane 27 must be reduced to the extent that the valve membrane 27 lifts off from the opening 31 of the filter-side main vent duct 12b due to the fluid pressure (essentially atmospheric pressure) acting on its flow side 27b in the area of the filter-side main vent duct 12b. Thus, the valve element changes over to its release position, and consequently the main vent valve 13 opens and releases the main vent duct 12. The pressure in the pressure chamber 33 is reduced by opening the second pilot valve 14b so fluid can flow from the pressure chamber 33 to the fuel tank 4 (where negative pressure prevails). Since the second check valve 32b is still open, fluid keeps flowing from the activated carbon filter 5 to the pressure chamber 33, but this inflowing volumetric flow of the fluid is substantially smaller than the outflowing volumetric flow towards the fuel tank 4 because the flow diameter of the second opening 34b is substantially smaller then the flow diameter of the opened second pilot valve 14b. Thus, the opening of the second pilot valve 14b reduces the pressure in the pressure chamber 33, the main vent valve 13 opens and the main vent duct 12 is released for the fluid to flow from the activated carbon filter 5 to the fuel tank 4 and thus increase pressure in the fuel tank 4. The fluid can thus flow from the filter-side main vent duct 12b through the main vent valve 13 to the tank-side main vent duct 12a.

By alternately or additionally switching the secondary vent valves 18, 19 of the filter valve group 16 and/or of the filling tube valve group 17, a fine adjustment of the venting process (which also refers to the venting under negative pressure in the fuel tank 4) can also be achieved by opening and closing the secondary vent duct 15 in addition to and independently from the main vent duct 12, wherein here—due to the several secondary vent valves 18, 19—a multi-step opening or closing is also possible and thus a corresponding fine adjustment of the entire volumetric flow of the fluid.

Here, in the valve system 2 as pilot valve 14a, 14b, as filter secondary vent valves 18 of the filter valve group 16 and as filling tube secondary vent valves 19 of the filling tube valve group 17, one SMA valve has been put in in each case. FIG. 8 shows, as an example, a valve 18 by means of which the structure and function of an SMA valve should be explained in representation of the valves 14a, 14b, 18 and 19. The use of such SMA valves allows the electronic control of the valve system 2 by selectively controlling and activating individual valves in order to make a selective or controlled venting of the fuel tank 4 possible. To date, this had been impossible with the use of purely mechanical valves, which are moved from an opening to a closing position by means of float balls or the like.

The SMA valve 14a has a valve housing formed by the housing 10 of the valve system 2, closed on its upper side by a housing lid and on its underside by a housing bottom (both not shown). The valve housing encloses a valve chamber 40 and forms a valve opening 41. Inside the valve chamber 40, an axially movable valve element 42 has been arranged in a direction of movement B to close the valve opening 41 in a closing position and release the valve opening 41 in an opening position. To activate the valve element 42 in an opening direction or stroke direction H, a wire-shaped SMA element 43 made of a shape memory alloy is held on to the valve element 42, more precisely to its first end section 42a, with a middle section 43c. So electric current can be applied, the ends 43a, 43b of the SMA element 43 are electrically connected to the printed circuit board 24.

To move the valve element 42 in a closing or return position R, a return element 44—here a threaded compression spring concentrically enclosing a second end section 42b of the valve element 42—is supported by the printed circuit board 24 with a first end and by the first end section 42b of the valve element 42 (radially widened compared to the second end section 42b) with a second end.

On the one hand, an intermediate wall 45 formed by the housing and, on the other hand, a recess 46—here in form of a passage opening—are provided in the printed circuit board 24 to serve as guides for the valve element 42. To guide the SMA element 43, the intermediate wall 45 is broken by recesses 47 extending in the direction of movement B (cf. FIG. 5). In order to reliably close the valve opening 41 in closing direction—as shown in FIG. 8—a sealing element 48 that acts together with a sealing seat surrounding the valve opening 41 to close the valve opening 41 has been arranged on the end section 42a facing the valve opening 41.

To control the valve 18 and apply electric current to the SMA element 43, in order to shorten it and thus bring about the activation of the valve element 42, the ends 43a, 43b are electrically connected to the printed circuit board 24, specifically in each case by means of a crimp connector 49. The ends 43a, 43b of the SMA element 43 are in each case fixed to a seat 50 of the crimp connector 49 and thus make indirect contact with the printed circuit board 24 by means of the crimp connectors 49. The crimp connectors 49 project perpendicularly towards the direction of movement B, in each case laterally with a protrusion A1, above the printed circuit board 24. Furthermore, the crimp connectors 49 extend in stroke direction H from an upper side 51a of the printed circuit board 24 and parallel to it in the direction of the housing bottom (not shown explicitly), i.e. with a protrusion A2 starting from the upper side 51a of the printed circuit board 24 towards its underside 51b, wherein the seat 50 of the crimp connector 49 ends at a distance from the housing bottom, is therefore arranged in a free-floating way inside the valve chamber 40. A section 52 of the crimp connector 49 spaced away from the seat 50 is electrically connected to the printed circuit board 24 via clamping means 53. Here, the section 52 can both lay flat on the upper side 51a and also be at least partially at a short distance from the upper side 51a. To achieve a connection independent from the tolerances of the printed circuit board 24 or its upper side 51a, the crimp connector 49 or its section 52 must be fully at a minimum distance from the upper side 51a and the crimp connector 49 is merely supported by the clamping means 53. Thus, the crimp connectors 49 establish the electrical connection between the ends 43a, 43b of the SMA element 43 fixed thereto and the printed circuit board 24. Owing to the crimp connectors 49 protruding both laterally and in stroke direction H, an additional length of the SMA element 43, namely the length of the diagonal of an imaginary rectangle having the side lengths A1 and A2, can be used to activate the valve element 42, thereby achieving an overall reduction of the structural height of the valve 18 and thus of the entire valve system 2. The printed circuit board 24 itself is contacted by a connector that can be plugged into a receiving space 54 of the housing 10 using an electrical connection (cf. FIGS. 3 & 4).

Figure 9:
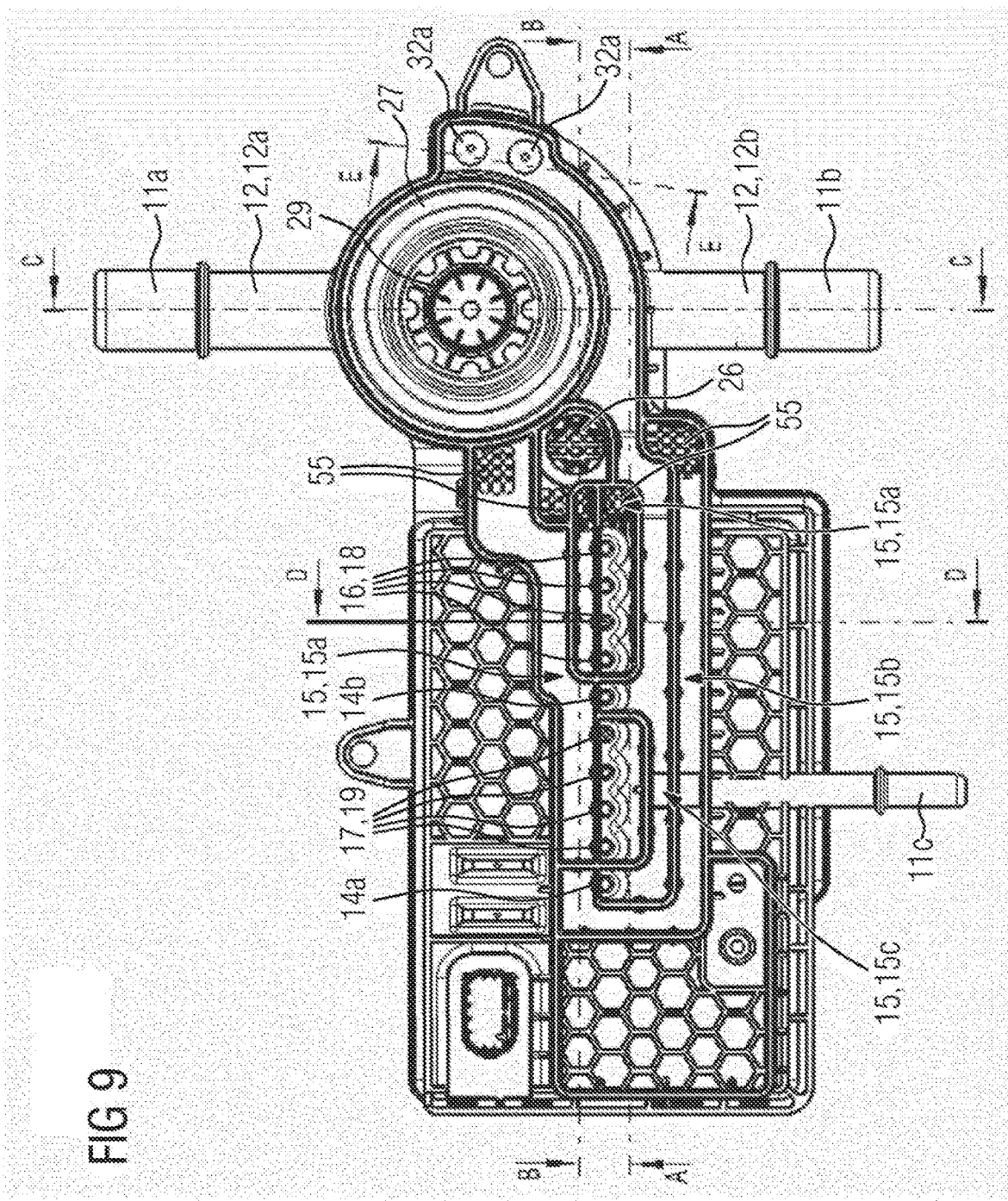
FIG. 9 is a top view of a valve system according to a second embodiment.
Figure 10:
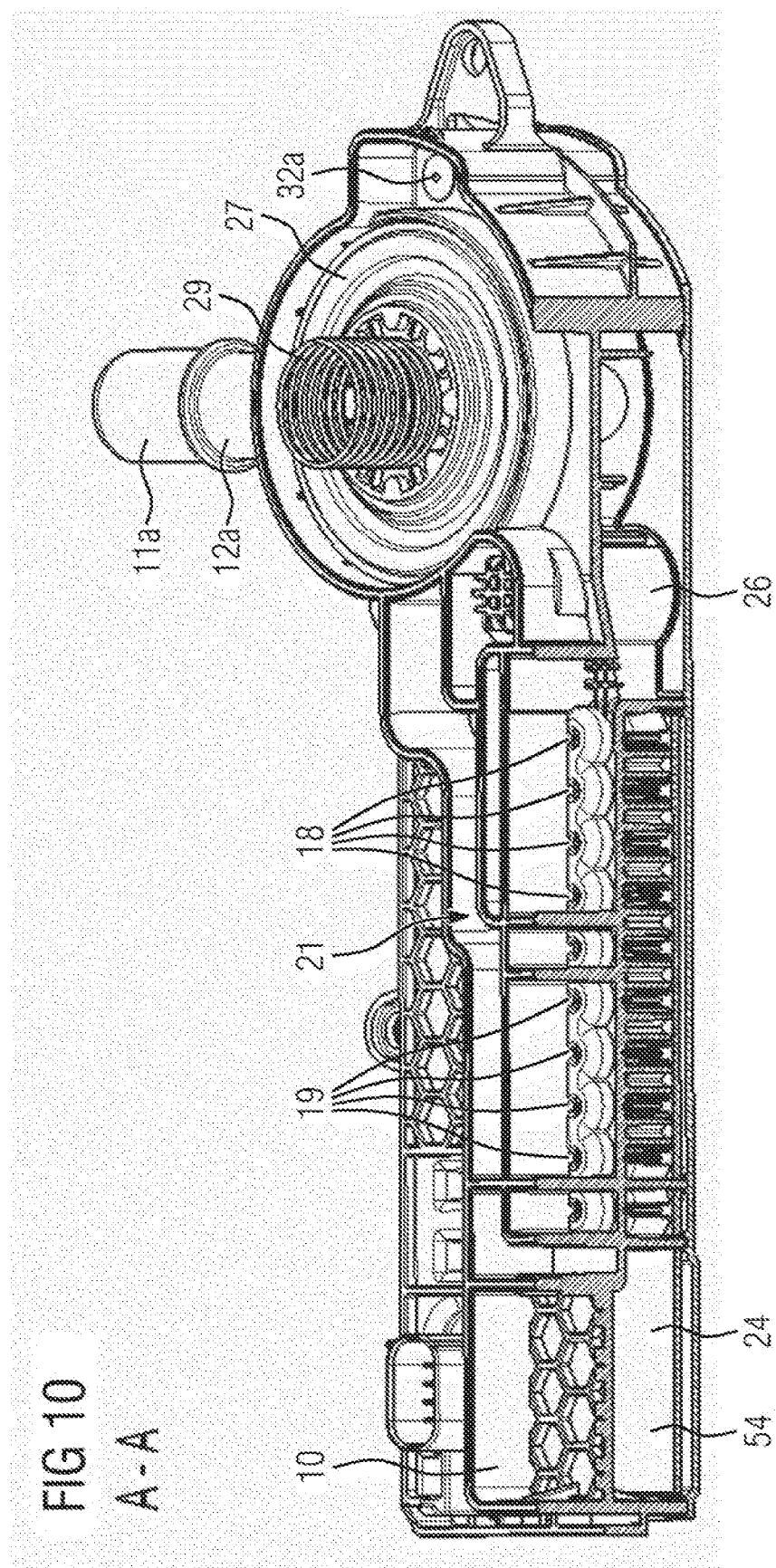
FIG. 10 is a perspective view of a longitudinal section of the valve system according to the second embodiment along line A-A according to FIG. 9.
Figure 11:
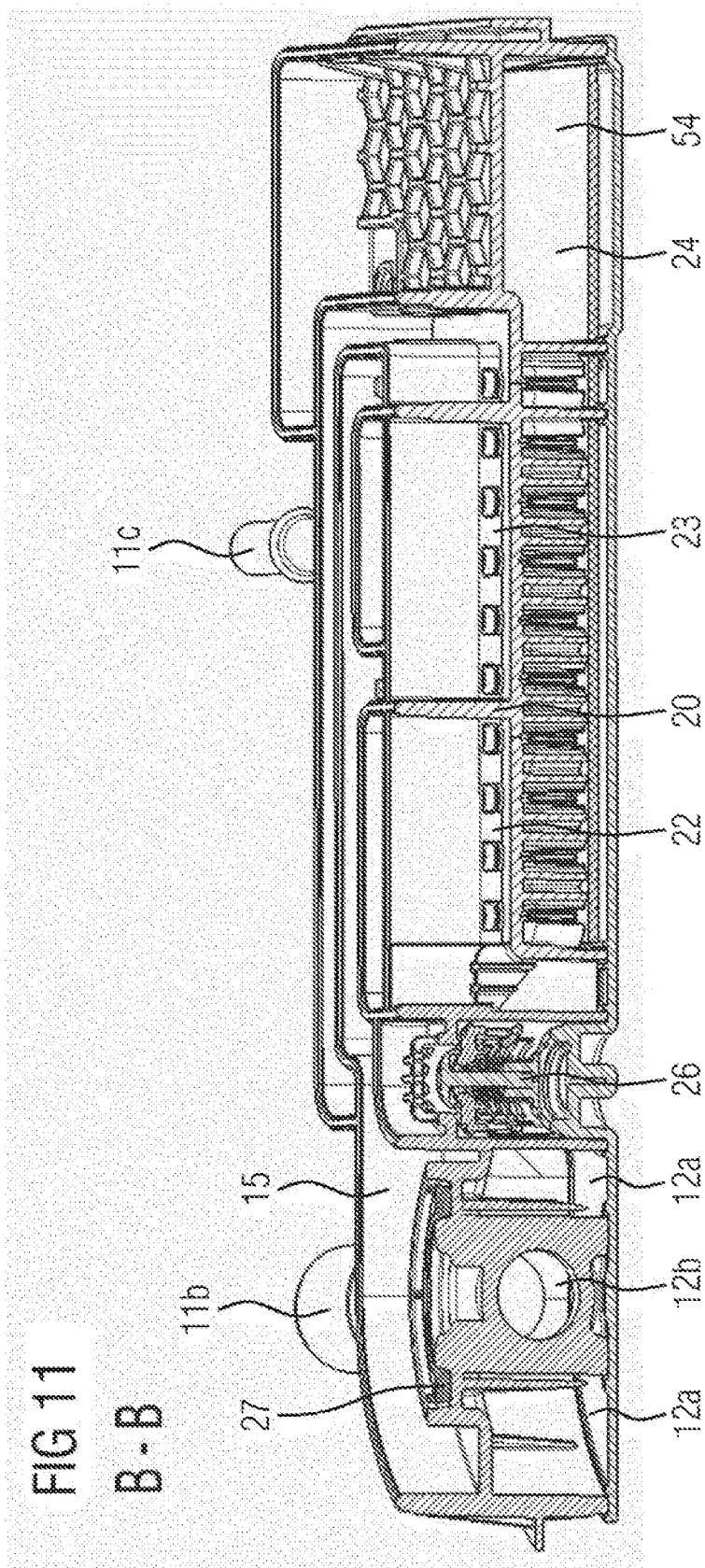
FIG. 11 is a perspective view of a longitudinal section of the valve system according to the second embodiment along line B-B according to FIG. 9.
Figure 12:
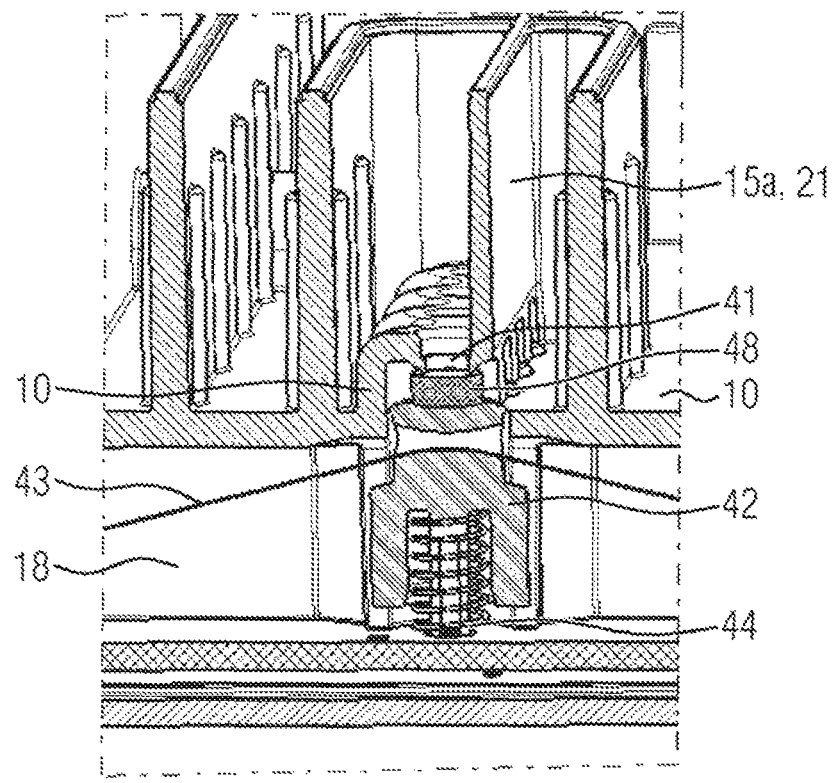
FIG. 12 is a valve group of the valve system according to the second embodiment.

FIG. 9 shows the valve system 2 according to a second embodiment for the fuel tank 4, FIG. 10 and FIG. 11 show in each case a longitudinal section through the valve system 2 according to FIG. 9, and FIG. 12 shows an enlarged section of the valve system 2. Since functionality and structure of the valve system 2 according to the second embodiment correspond essentially to the valve system according to the first embodiment described above, the individual features or components of the valve system 2 according to the second embodiment have been provided with the same reference signs. Furthermore, the explanations given with regard to valve system 2 according to the first embodiment apply basically to the valve system 2 according to the second embodiment as well.

The valve system 2 comprises a housing 10 with a tank connection 11a to connect the valve system 2 to the fuel tank 4 or to the vent line 3a leading to the fuel tank 4. Moreover, the housing 10 comprises a filter connection 11b for connecting the valve system 2 to the activated carbon filter 5 or the vent line 3b leading to the activated carbon filter 5 and a filling tube connection 11b for connecting the valve system 2 to the filling tube 6 of the fuel tank 4 or the vent line 3c leading to the filling tube 6. The fuel tank 4, the activated carbon filter 5 and the filling tube 6 as well as the vent lines 3a, 3b, 3c possibly connecting the valve system 2 thereto are not explicitly shown in FIG. 9. For this purpose, reference is made to FIG. 1 and FIG. 2. In principle, it could also be conceivable to integrate the valve system 2, in each case without vent line, directly into the fuel tank 4, the activated carbon filter 5 or the filling tube 6 or the valve system 2.

On the upper side, the housing 10 can be closed by a housing lid (not shown), on the bottom side by a housing bottom, to seal it pneumatically towards the surroundings.

In the other exemplary embodiment, the tank connection 11a and the filter connection 11b are or can be fluidically connected to one another by a main vent duct 12. It could also be possible for the main vent duct 12 to connect the tank connection 11a and the filling tube connection 11c, something not shown explicitly here. A main vent valve 13, which closes the main vent duct 12 in a closing position and releases it in a releasing position, is arranged in the main vent duct 12. In addition, the main vent valve 13 comprises two pilot valves, a first pilot valve 14a and a second pilot valve 14b, which are executed as valves with a valve element that can be activated by an SMA element. With regard to the design of the pilot valves 14a, 14b, reference is made here once again to FIG. 8 or FIG. 15.

In the exemplary embodiment shown, the tank connection 11a, more precisely a tank-side main vent duct 12a, is moreover fluidically connected to the filter connection 11b, more precisely to a filter-side main vent duct 12b, and the tank connection 11a, more precisely the tank-side main vent duct 12a, to the filling tube connection 11c by means of a secondary vent duct 15. In the secondary vent duct 15, a filter valve group 16 and a filling tube valve group 17 have been arranged, which include here exemplarily in each case four secondary vent valves, namely four filter secondary vent valves 18 of the filter valve group 16 and four filling tube secondary vent valves 19 of the filling tube valve group 17, which have in each case a valve element that can be activated by an SMA element (cf. FIG. 8 or 15), which closes or releases the secondary vent duct 15 leading to the activated carbon filter 5 or to the filling tube 6. FIG. 12 shows a section of the valve system 2 that shows such a valve group, here the filter valve group 16 with the filter secondary vent valves 18.

The secondary vent duct 15 has various sections or branches. A tank-side secondary vent duct 15a leads from the tank connection 11a, more precisely the tank-side main vent duct 12a, to the secondary vent valves 18, 19 of the filter valve group 16 and to the filling tube valve group 17, so that when the fuel tank 4 is vented by the tank-side secondary vent duct 15a, the fluid can flow initially towards the opened secondary vent valves 18, 19, then through them and finally from them to the activated carbon filter 5 or also to the filling tube 6. In other words, the filter valve group 16 or its filter secondary vent valves 18 and the filling tube valve group 17 or its filling tube secondary vent valves 19 are, on the one hand, connected in each case to the tank-side secondary vent duct 15a. On the fluidically other side of the secondary vent valves 18, 19, i.e. on a side of the secondary vent valves 18, 19 of the valve groups 16, 17 fluidically facing the filter connection 11b or the filling tube connection 11c, the secondary vent duct 15 has two sections separated from one another by separating walls, namely a filter-side secondary vent duct 15b and a filling tube-side secondary vent duct 15c. In other words, on its other side, the filter valve group 16 is thus connected to the filter-side secondary vent duct, the other side of the filling tube valve group 17 thus to the filling tube-side secondary vent 15c.

In the second embodiment, the tank-side main vent 12a and the tank-side secondary vent duct 15a as well as the filter-side main vent duct 12*b* and the filter-side secondary vent duct 15*b* are arranged on different pines of the valve system 2 and fluidically connected by grids 55.

In the area of the secondary vent valves 18, 19 or of the valve groups 16, 17, the tank-side secondary vent duct 15*a* forms a common first valve chamber 21, through which the fluid that escapes from the fuel tank 4 can be supplied to each secondary vent valve 18, 19. The filter-side secondary vent duct 15*b* forms a second valve chamber 22 and the filling tube-side secondary vent duct 15*c* forms a common third valve chamber 23. The second valve chamber and the third valve chamber are fluidically separated from one another by a separating wall 20.

All ducts 12, 12*a*, 12*b*, 15, 15*a*, 15*b*, 15*c* described above are executed as one single piece with the housing 10 of the valve system 2 and formed by the corresponding separating walls formed on the housing 10, which makes it possible to significantly reduce the number of parts of the valve system 2. The valves (14*a*, 14*b*, 18, 19) having a valve element that can be activated by an SMA element are additionally arranged on a joint printed circuit board 24. Moreover, several sensors 25 (not explicitly shown here) can be integrated onto the printed circuit board 24, for example pressure sensors and/or temperature sensors and/or position sensors and/or acceleration sensors and/or sensors to determine gasoline composition—and thus fuel quality—in order to determine measured values inside the valve system 2, which can then be used, for example, to control the valve system 2 or individual valves.

Furthermore, the valve system 2 comprises a safety valve 26, here a combined safety valve, both for excess pressure and for negative pressure that can possibly be built inside the fuel tank 4, especially when the valve system 2 itself is not activated. To do this, the safety valve 26 ends in this embodiment, on the one hand, in an intermediate chamber that is connected to the tank-side main vent duct 15 by means of a grid 55. On the other hand, the safety valve 26 is fluidically connected to the filter-side main vent duct 12*b*. The housing of the safety valve 26 is executed as one single piece with the housing 10 of the valve system 2 or a part of the housing 10 of the valve system 2.

Moreover, the valve system 2 can also have a fuel separator and a rollover valve, which can be integrated into the fuel separator, for example. Provided a fuel separator and/or a rollover valve are provided, they are integrated between the tank connection 11*a* and the fuel tank 4 or also in the tank-side main vent duct 12*a*. The structure and function of such fuel separators and/or rollover valves are known to the specialist from the state of the art, so that a separate description is dispensed with for reasons of clarity.

The main vent valve 13 comprises as valve element a valve membrane 27, executed circularly here. In an edge area, the valve membrane 27 has a surrounding U-shaped section that engages in a likewise circular sealing seat 28 executed from the housing 10 of the valve system 2. The valve membrane has a pressure side 27*a* and a flow side 27*b*, wherein a pressure chamber 33 of the main vent valve 13 is provided on the pressure side 27*a*. A ring-shaped external area of the flow side 27*b* is adjacent to the tank-side main vent duct 12*a*, an inner partial area of the flow side 27*b* is adjacent to the filter-side main vent duct 12*b*. The valve membrane 27 and with it, the valve element of the main vent valve, 13 are movable between a closing position and a releasing position. In the closing position, the flow side 27*b* of the valve membrane 27 closes the main vent duct 12 in that the valve membrane 27 abuts an opening 31 of the filter-side main vent duct 12*b* and closes it fluidically tight.

In the release position, the flow side 27*b* of the valve membrane 27 opens the main vent duct 12 in that the valve membrane 27 is lifted off the opening 31 of the filter-side main vent duct 12, thereby allowing fluid to flow in or out of the filter-side main vent duct 12*b*. A pre-stress element, here a threaded pressure spring, from which a force on the pressure side 27*a* of the valve membrane 27 originates, is provided in the pressure chamber 33 that—unless it is not compensated by other forces—presses on the flow side 27*b* of the valve membrane 27 against the opening 31 of the filter-side main vent duct 12*b*, thereby closing it long with the main vent valve 13.

The pressure chamber 33 is fluidically connected to the tank connection 11*a* by means of a first opening 34*a* and to the filter connection 11*b* by means of a second opening 34*b*. In the first opening 34*a*, a first check valve 32*a* has been arranged, which allows a fluid current to flow from the tank connection 11*a* to the pressure chamber 33 and prevent it from flowing in opposite direction. In the second opening, a second check valve 32*b* has been arranged to allow a fluid current to flow from the filter connection 11*b* to the pressure chamber 33 and prevent it from flowing in opposite direction. FIG. 16 shows a cross section through the housing 10 of the valve system 2, in which the fluid ducts 30*a*, 30*b* are executed. The check valves 32*a*, 32*b* are thus arranged in openings 34*a*, 34*b* formed by the housing 10. The first opening 34*a* is arranged on an end or edge of a first fluid duct 30*a* or inside a first fluid duct 30, so that the first fluid duct 30*a* extends on both sides of the first opening 34*a*. The second opening 34*b* is arranged on one end or edge of a second fluid duct 30*b* or inside a second fluid duct 30*b*, so that the second fluid duct 30*b* extends on both sides of the second opening 34*b*.

The main vent valve 13 comprises a first pilot valve 14*a* and a second pilot valve 14*b* with a valve element that can be activated in each case by an SMA element. The first pilot valve 14*a* is, on the one hand, fluidically connected to the pressure chamber 33 of the main vent valve 13 and, on the other hand, to the filter-side main vent duct 12*b* (see FIG. 13) or to the filter-side secondary vent duct 15*b*. The second pilot valve 14*b* is, on the one hand, fluidically connected to the pressure chamber 33 of the main vent valve 13 and, on the other hand, to the tank-side main vent duct 12*a* or to a tank-side secondary vent duct 15*a* (see FIGS. 9, 10, 11).

Figure 13:
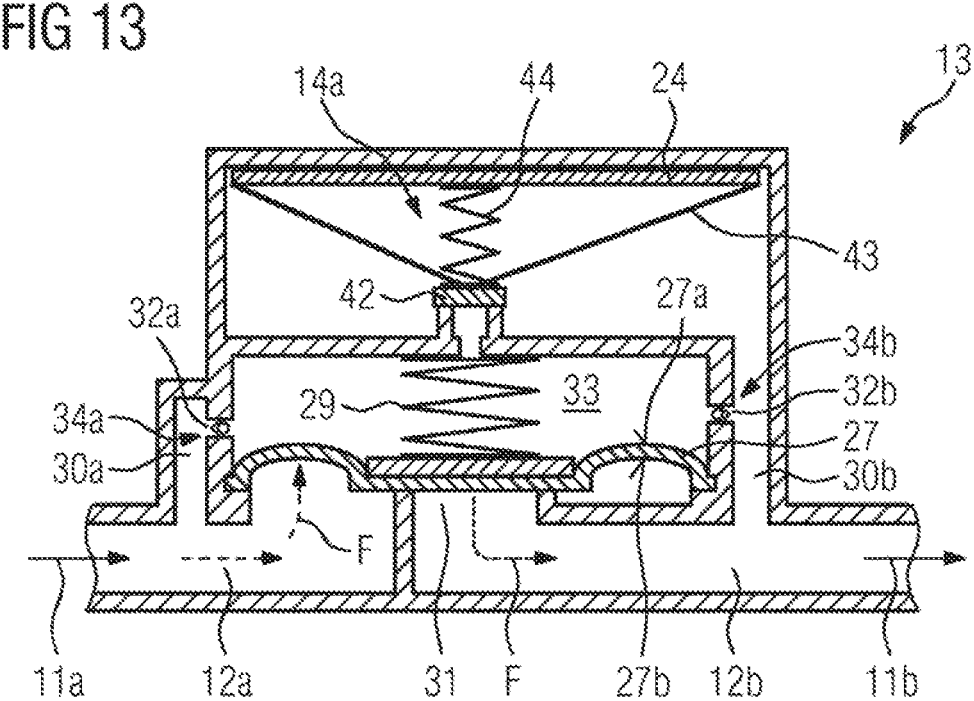
FIG. 13 is a schematic sketch of a main vent valve of the valve system according to the second embodiment.

FIG. 13 shows, in particular, that the two pilot valves 14*a*, 14*b* allow extensive control of the main vent valve 13 when there is both excess pressure and negative pressure in the fuel tank. When there is excess pressure in the fuel tank 4 (compared to the atmospheric pressure), there is initially also excess pressure in the pressure chamber 33 and the main vent valve 13 is closed.

Opening the first pilot valve 14*a* creates a fluidic connection to the atmospheric pressure, and this decreases the excess pressure in the pressure chamber 33 and finally the main vent valve 13 opens. When there is negative pressure in the fuel tank 4 (compared to the atmospheric pressure), the pressure chamber 33 is at first fluidically connected to the atmospheric pressure and the main vent valve 33 is closed. Opening the second pilot valve 14*b* opens a fluidic connection to the negative pressure in the fuel tank 4, which decreases the pressure in the pressure chamber 33 and finally the main vent valve 13 opens.

To ensure that the pilot valves 14*a*, 14*b* will decrease the pressure in the pressure chamber 33 that is needed for opening the main vent valve 33, more fluid must flow out through the pilot valve 14*a*, 14*b* that is open in each case than flow into the pressure chamber 33 through the first opening 34a or the second opening 34b. To achieve this, it is foreseen that the maximum flow diameter of the first opening 34a will be smaller with the first check valve 32a than the maximum flow diameter of the first pilot valve 14a and that the maximum flow diameter of the second opening 34b will be smaller with the second check valve 32b than the flow diameter of the second pilot valve 14a.

In the following, the basic functioning or structure of the main vent valve 13 will be shown and explained in more detail by means of FIGS. 13 and 14. When refueling the fuel tank 4, volumetric flows greater than 40 L/min are expected, wherein the pressure in the fuel tank 4 must be kept low so the fuel flowing into the filling tube 6 does not rise prematurely in the filling tube 6, thereby leading to the switching off of the pump nozzle. This is achieved here by the main vent valve 13 executed as pre-controlled membrane valve. When the pressure increases in the fuel tank 4, i.e. when an excess pressure compared to the atmospheric pressure is created, the fluid (gasoline) flows out of the fuel tank 4 through the vent line 3a, the tank connection 11a into the main vent duct 12, more precisely the tank-side main vent duct 12a. The valve membrane 27 is closed, which means that the fluid cannot keep flowing to the activated carbon filter 5. The fluid flows to the pressure chamber 33 of the main vent valve 13 through the first fluid duct 30a, the first opening 34a and the open first check valve 32a. The second check valve 32b is closed, like the two pilot valves 14a, 14b. Therefore, since excess pressure also builds up in the pressure chamber 33 compared to the atmospheric pressure, the valve membrane 27 is pressed against the opening 31 of the filter-side main vent duct 12b and the valve element is thus in its closing position and the main vent valve 13 is closed. No fluid can flow from the fuel tank 4 through the main vent duct 12 into the activated carbon filter 5.

Excess pressure in the fuel tank 4 can also be created by heating even if the fuel tank 4 is closed.

So fluid can flow out of the fuel tank 4 through the main vent duct 12 into the activated carbon filter 5 and thus decrease the excess pressure in the fuel tank 4, the main vent valve 13 must be opened. To do this, the pressure in the pressure chamber 33 and thus on the pressure side 27a of the valve membrane 27 must be reduced to the extent that the valve membrane 27 lifts off from the opening 31 of the filter-side main vent duct 12b due to the fluid pressure acting on its flow side 27b in the area of the tank-side main vent duct 12a; thus, the valve element changes over to its release position, which opens the main vent valve 13 and releases the main vent duct 12. The pressure in the pressure chamber 33 is reduced by opening the first pilot valve 14a, thereby allowing fluid to flow from the pressure chamber 33 to the activated carbon filter 5. Since the first check valve 32a remains open, fluid keeps flowing from the fuel tank 4 to the pressure chamber 33, but this further volumetric flow of the fluid is significantly smaller than the volumetric flow escaping towards the activated carbon filter 5 because the flow diameter of the first opening 34a with the first check valve 32a is considerably smaller than the flow diameter of the opened first pilot valve 14a. Hence, the pressure in the pressure chamber 33 is reduced by opening the first pilot valve 14a, the main vent valve 13 opens and the main vent duct 2 is released for the fluid to flow from the fuel tank 4 to the activated carbon filter 5, thereby reducing the pressure in the fuel tank 4. The fluid can thus flow from the tank-side main vent duct 12a through the main vent valve 13 to the filter-side secondary vent duct 15b.

If there is negative pressure in the fuel tank 4 generated by cooling, for example, the pressure compensation can likewise be controlled through the main vent valve 13. If the pressure decreases in the fuel tank 4, i.e. a negative pressure is generated there compared to atmospheric pressure, fluid (gasoline or air) flows through the activated carbon filter 5 through the vent line 3b, the filter connection 11b into the main vent duct 12, more precisely into the filter-side main vent duct 12b. The valve membrane 27 is closed, i.e. the fluid cannot continue flowing to the fuel tank 4. The fluid flows into the pressure chamber 33 of the main vent valve 13 through the second fluid duct 30b, the second opening 34b and the open second check valve 32b. Since the first check valve 32a is closed, like the two pilot valves 14a, 14b, atmospheric pressure essentially prevails in the pressure chamber 33 and thus a higher pressure than in the tank-side main vent duct and thus in the area of the flow side 27b of the valve membrane 27 adjoining the tank-side main vent duct 12a. Therefore, the valve membrane 27 is pressed against the opening 31 of the filter-side main vent duct 12b, the valve element is thereby in its closing position and the main vent valve 13 is thus closed. No fluid can flow from the activated carbon filter 5 through the main vent duct 12 to the fuel tank 4.

So fluid can flow from the activated carbon filter 5 through the main vent duct 12 into the fuel tank 4, thereby reducing the negative pressure in the fuel tank 4, it is necessary to open the main vent valve 13. To do this, the pressure in the pressure chamber 33 and thus on the pressure side 27a of the valve membrane 27 must be reduced to the extent that the valve membrane 27 lifts off the opening 31 of the filter-side main vent duct 12b due to the fuel pressure (essentially atmospheric pressure) acting on its flow side 27b in the area of the filter-side main vent duct 12b, thereby moving the valve element to its releasing position, which opens the main vent valve 13 and releases the main vent duct 12. The pressure in the pressure chamber 33 is reduced by opening the second pilot valve 14b so fluid can flow from the pressure chamber 33 into the fuel tank 4 (where negative pressure prevails). Since the second check valve 32b remains open, fluid keeps flowing from the activated carbon filter 5 into the pressure chamber 33, but this inflowing volumetric flow of the fluid is significantly smaller than the outflowing volumetric flow towards the fuel tank 4 because the flow diameter of the second opening 34b with the second check valve 32b is significantly smaller than the flow diameter of the opened second pilot valve 14b. Hence, the pressure in the pressure 33 is reduced by opening the second pilot valve 14b, the main vent valve 13 opens and the main vent duct 12 is released for the fluid current to flow from the activated carbon filter 5 to the fuel tank 4 and is thus released for increasing pressure in the fuel tank 4. The fluid can therefore flow from the filter-side main vent duct 12b through the main vent valve 13 into the tank-side main vent duct 12a.

By alternately or additionally switching the secondary vent valves 18, 19 of the filter valve group 16 and/or of the filling tube valve group 17, it is possible to achieve a fine adjustment of the venting process (this is also understood to be the ventilation under negative pressure in the fuel tank 4), in that the secondary vent duct 15 is also opened or closed in addition to and independently from the main vent duct 12, wherein here, owing to the several secondary vent valves 18, 19, it is also possible to achieve a corresponding fine adjustment of the entire volumetric flow of the fluid by opening or closing in multiple steps.

Here, an SMA valve is placed in each case in the valve system 2 as pilot valve 14a, 14b, as filter secondary vent valves 18 of the filter valve group 16 and as filling tube secondary vent valves 19 of the filling tube valve group 17. FIG. 8 and FIG. 15 show exemplarily a valve 18 by means of which the structure and function of an SMA valve is explained as it represents valves 14a, 14b, 18 and 19. The use of such SMA valves allows the valve system 2 to be electronically controlled by selectively controlling and activating individual valves in order to achieve a targeted or controlled or regulated venting of the fuel tank 4. To date, this had not been possible when purely mechanical valves, movable between an opening and a closing position by means of floaters or the like, for example, were used.

The SMA valve 14a has a valve housing formed by the housing 10 of the valve system 2 and closed on its upper side by a housing lid (not shown) and on its bottom side by a housing bottom. The valve housing encloses a valve space 40 and forms a valve opening 41. Inside the valve space 40, a valve element 42—axially movable in direction of movement B between a closing position for closing the valve opening 41 and an opening position for releasing the valve opening 41—is arranged. To activate the valve element 42 in opening direction or stroke direction H, there is a wire-shaped SMA element 43 made of a shape memory alloy held onto the valve element 42 with a middle section 43c, more precisely onto its first end section 42a. So an electric current can be applied, the SMA element 43 is electrically connected to the printed circuit board 24 with its ends 43a, 43b.

To move the valve element 42 to a closing position or return position R, a return element 44, here a threaded compression spring that concentrically encloses a second end section 42b of the valve element 42 and with one first end supported by the printed circuit board 24 and with a second end supported by the first end section 42a of the valve element 42, which is radially widened compared to the second end section 42b.

To guide the valve element 42 during its activation, an intermediate wall 45 formed by the housing, on the one hand, and a recess 46—here in form of a through opening—are provided in the printed circuit board 24, on the other hand, serve. To guide the SMA element 43, the intermediate wall 44 is broken by recesses 47 extending in direction of movement B (cf. FIG. 5). To reliably close the valve opening 41 in the closing position—a shown in FIG. 8—a closing sealing element 48 acting together with a sealing seat that encloses the valve opening 41 has been arranged on the end section 42a facing the valve opening 41.

To control the valve 18 and apply electric current to the SMA element 43 to shorten it and thus activate the valve element 42, the ends 43a, 43b are electrically connected to the printed circuit board 24, namely in each case by means of a crimp connector 49. The ends 43a, 43b of the SMA element 43 are in each case fixed in a seat 50 of the crimp connector 49 and thus make indirect contact with the printed circuit board 24 through the crimp connectors 49. A section 52 of the crimp connector 49 spaced apart from the seat 50 is electrically connected to the printed circuit board 24 by clamping means 53. In this case, the section 52 can both lay flat on the upper side 51a or also be partially separated a little bit from the upper side 51a. To achieve a connection independent from the tolerances of the printed circuit board 24 or its upper side 51a, the crimp connector 49 or its section 52 is fully minimally spaced apart from the upper side 51a and the crimp connector 49 is merely supported by the clamping means 53. Thus, the crimp connectors 49 establish the electrical connection between the ends 43a, 43b of the SMA element 43 fixed thereto and the printed circuit board 24. The printed circuit board 24 itself is electrically contacted by a connector that can be plugged in a receiving space 54 of the housing 10 (cf. FIGS. 10, 11).

Therefore, the disclosure suggests, as a whole, a valve system that can be used universally and especially adapted, for example, to various tanks of different vehicles possibly without structural change. In particular, owing to the electric controllability when using the SMA valves or magnetic valves or DEA valves, various variants are also possible through the control software and their adaptation.

With the respective equipment, the suggested valve system takes over all valve functions necessary for aerating and venting a tank system. Depending on the specific design, the inflowing or outflowing fluid current can be controlled and regulated in steps by the corresponding control of the valves, which can also have different cross sections and/or also be possibly controlled sequentially or in parallel. Most valves also ensure a redundancy of the valve system. If one valve fails, several valves can be used for venting. The path and quantity the fluid will take can also be controlled and regulated (through the activated carbon filter and/or through the filling tube). Possibly, the entire fluid can also be supplied to the filling tube or alternately to the activated carbon filter.

Due to the high degree of integration and especially through the use of SMA valves or magnetic valves or DEA valves, the assembly space for the valve system can be significantly reduced compared to known similar valve systems.

LIST OF REFERENCE SIGNS

1 Tank system
2 Valve system
3a, 3b, 3c Vent lines
4 Fuel tank
5 Activated carbon filter
6 Filling tube
7a, 7b Valve
8 Atmosphere
9 Internal combustion engine
10 Housing
11a Tank connection
11b Filter connection
11c Filling tube connection
12 Main vent duct
12a Tank-side main vent duct
12b Filter-side main vent duct
13 Main vent valve
14a First pilot valve
14b Second pilot valve
15 Secondary vent duct
15a Tank-side secondary vent duct
15b Filter-side secondary vent duct
15c Filling tube-side secondary vent duct
16 Filter valve group
17 Filling tube valve group
18 Filter secondary vent valve
19 Filling tube secondary vent valve
20 Separating wall
21 First valve chamber
22 Second valve chamber
23 Third valve chamber
24 Printed circuit board
25 Sensor
26 Safety valve
27 Valve element, valve membrane
27a Pressure side 27b Flow side
28 Sealing seat
29 Prestressed element
30a First fluid duct
30b Second fluid duct
31 Opening of the filter-side main vent duct 12b
32a First check valve
32b Second check valve
33 Pressure chamber of the main vent valve 13
34a First opening
34b Second opening
40 Valve chamber
41 Valve opening
42 Valve element
42a First end section
42b Second end section
43 SMA element
43a, 43b End of the SMA element
43c Middle section of the SMA element
44 Return element
45 Intermediate wall
46 Recess in the printed circuit board
47 Recess in the intermediate wall
48 Sealing element
49 Crimp connector
50 Seat of the crimp connector
51a Upper side of the printed circuit board
51b Underside of the printed circuit board
52 Section of the crimp connector
53 Clamping means
54 Receiving space of the housing
55 Grid
Fa Flow of the fluid
Fb Flow of the fluid
F Flow of the fluid
B Direction of movement of the adjusting element
H Stroke direction
R Return direction
A1 Lateral protrusion of the crimp connector
A2 Axial protrusion of the crimp connector

The invention claimed is:

1. A valve system for a fuel tank for the controlled, regulated, or guided output or input of a fluid from the or into the fuel tank, the valve system comprising:
   a) a housing;
   a1) a tank connection defined in the housing to connect the valve system to a fuel tank;
   a2) a filter connection defined in the housing to connect the valve system to an activated carbon filter; and
   a3) a filling tube connection defined in the housing to connect the valve system to a filling tube of the fuel tank;
   b) a main vent duct defined in the housing, wherein the tank connection and either of the filter connection or the filling tube connection are configured to be fluidically connected to one another by the main vent duct, wherein at least one main vent valve with a valve element is arranged in the main vent duct that closes the main vent duct in a closing position and releases the main vent duct in a releasing position;
   c) a secondary vent duct defined in the housing, wherein the tank connection or a tank-side main vent duct area in fluid communication with the tank connection and the filling tube connection or a filling tube-side main vent duct area in fluid communication with the filling tube connection are configured to be fluidically connected by the secondary vent duct; and
   d) at least one valve group with at least one secondary vent valve is defined in the secondary vent duct, the at least one secondary vent valve that closes the secondary vent duct in a closing position and releases the secondary vent duct in a releasing position, the at least one secondary vent valve being configured to be activated independently from the at least one main vent valve.

2. The valve system according to claim 1, wherein the valve element of the at least one main vent valve comprises a valve membrane with a pressure side and a flow side, wherein a pressure chamber of the main vent duct is provided on the pressure side of the valve membrane and wherein the flow side of the valve membrane closes the main vent duct in the closing position of the valve element and releases the main vent duct in the releasing position of the valve element.

3. The valve system according to claim 2, wherein a prestressed element from which a force originates to the pressure side of the valve membrane is provided in the pressure chamber on the pressure side of the valve membrane.

4. The valve system according to claim 2, wherein the pressure chamber is at least one of: a) fluidically connected to the tank connection by a first opening, and b) fluidically connected to at least one of the filter connection and the filling tube connection by a second opening.

5. The valve system according to claim 4, wherein in the first opening a first check valve has been arranged to allow a fluid to flow in a direction from the tank connection to the pressure chamber and to prevent the fluid from flowing in an opposite direction.

6. The valve system according to claim 4, wherein the main vent valve comprises at least one first pilot valve configured to be fluidically connected, on the one hand, to the pressure chamber of the main vent valve and, on the other hand, to one of a filter-side main vent duct area in fluid communication with the filter connection or the filling-tube side main vent duct area.

7. The valve system according to claim 6, wherein a maximum flow diameter of the first opening is smaller than a maximum flow diameter of the first pilot valve.

8. The valve system according to claim 7, wherein the main vent valve comprises at least a second pilot valve configured to be fluidically connected, on the one hand, to the pressure chamber of the main vent valve and, on the other hand, to at least one of the tank-side main vent duct area and a tank-side secondary vent duct area.

9. The valve system according to claim 5, wherein a maximum flow diameter of the second opening is smaller than a flow diameter of the second pilot valve.

10. The valve system according to claim 8, wherein the tank connection or the tank-side main vent duct, the filter connection or the filter-side main vent duct area, and the filling tube connection or the filling tube-side main vent duct area are configured to be fluidically connected to one another by the secondary vent duct, wherein at least two valve groups are arranged in the secondary vent duct, the at least two valve groups including at least one filter valve group with at least one filter secondary vent valve and at least one filling tube valve group with at least one filling tube secondary vent valve, wherein the at least one filter secondary vent valve is configured to be fluidically connected, on the one hand, to the tank-side secondary vent duct area and, on the other hand, to one or more of the filter-side secondary vent duct area, and wherein the at least one filling tube secondary vent valve is configured to be fluidically connected, on the one hand, to the tank-side secondary vent duct area and, on the other hand, to the filling tube-side secondary vent duct area.

11. The valve system according to claim 10, wherein the filter valve group has at least two filter secondary vent valves.

12. The valve system according to claim 1, wherein the valve system has a safety valve fluidically connected to at least one of the tank-side main vent duct area and the tank-side secondary vent duct area, wherein a housing of the safety valve is formed unitarily with the housing of the valve system.

13. The valve system according to claim 8, wherein at least one of the secondary vent valves and the first or second pilot valves are mounted on a common printed circuit board and configured to be activated by at least one of an SMA element, a DEA actuator, and a magnetic valve.

14. The valve system according to claim 13, wherein several sensors selected from the group of pressure sensors, temperature sensors, position sensors, and acceleration sensors are configured with the printed circuit board to determine a gasoline composition.

15. The valve system according to claim 1, wherein the valve system comprises at least one of a fuel separator and a rollover valve, wherein the at least one of the fuel separator and the rollover valve are integrated one of: a) between the tank connection and the fuel tank, or b) into the tank-side main vent duct area.

16. The valve system according to claim 4, wherein in the second opening a second check valve has been arranged to allow a fluid to flow in a direction from the one of the at least one of filter connection and the filling tube connection to the pressure chamber and to prevent the fluid from flowing in an opposite direction.

17. The valve system according to claim 2, wherein the main vent valve comprises at least one first pilot valve configured to be fluidically connected, on the one hand, to the pressure chamber of the main vent valve and, on the other hand, to a filter-side secondary vent duct area or the filling tube-side secondary vent duct area.

18. The valve system according to claim 10, wherein the filling tube valve group has at least two filling tube secondary vent valves.

19. The valve system according to claim 1, wherein the valve system has a safety valve fluidically connected to at least one of a filter-side main vent duct area and the filter-side secondary vent duct, wherein the housing of the safety valve is formed unitarily with the housing of the valve system.

20. The valve system according to claim 15, wherein the valve system comprises both of the fuel separator and the rollover valve, and the rollover valve is integrated into the fuel separator.

* * * * *